United States Patent
Sun et al.

(12)

(10) Patent No.: US 11,224,051 B2
(45) Date of Patent: Jan. 11, 2022

(54) DATA TRANSMISSION METHOD AND APPARATUS

(71) Applicant: HUAWEI TECHNOLOGIES CO., LTD., Guangdong (CN)

(72) Inventors: Jizhong Sun, Xi'an (CN); Liang Chen, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 78 days.

(21) Appl. No.: 16/725,235

(22) Filed: Dec. 23, 2019

(65) Prior Publication Data

US 2020/0137769 A1 Apr. 30, 2020

Related U.S. Application Data

(63) Continuation of application No. PCT/CN2018/091325, filed on Jun. 14, 2018.

(30) Foreign Application Priority Data

Jun. 30, 2017 (CN) .......................... 201710525023.8

(51) Int. Cl.
*H04W 72/10* (2009.01)
*H04W 4/40* (2018.01)
(Continued)

(52) U.S. Cl.
CPC ............. *H04W 72/10* (2013.01); *H04W 4/40* (2018.02); *H04W 72/042* (2013.01);
(Continued)

(58) Field of Classification Search
CPC ...... H04L 5/0037; H04L 5/0091; H04W 4/40; H04W 72/0413; H04W 72/042;
(Continued)

(56) References Cited

U.S. PATENT DOCUMENTS

2010/0074200 A1* 3/2010 Li .................. H04L 1/1887
370/329
2013/0163494 A1 6/2013 Yu et al.
(Continued)

FOREIGN PATENT DOCUMENTS

CN 101657017 A 2/2010
CN 104936302 A 9/2015
(Continued)

OTHER PUBLICATIONS

Ericsson, "SPS Protocol for Sidelink",3GPP TSG-HAN WG2 #95 Tdoc R2-165526,Gothenburg, Sweden, 22nd Aug. 26, 2016,total 8 pages.
(Continued)

*Primary Examiner* — Kashif Siddiqui
(74) *Attorney, Agent, or Firm* — Womble Bond Dickinson (US) LLP

(57) ABSTRACT

According to various embodiments, a data transmission method and apparatus are provided in this application. In one embodiment, user equipment (UE) determines SPS assistance information based on N data packets at layer 2, where the SPS assistance information includes a frame number and a subframe number that correspond to a moment offset, wherein service features corresponding to the N data packets are the same, and wherein each of the service features includes at least a period configured by a base station for the UE. The moment offset of the data packets can be accurately predicted, and then the SPS assistance information is determined based on the frame number and the subframe number that correspond to the relatively accurate moment offset, to reduce impact of data packet fluctuation on a transmission delay. In addition, the UE can obtain an SPS resource without reporting an SR, so that the data transmission delay can be reduced.

20 Claims, 9 Drawing Sheets

(51) Int. Cl.
*H04W 72/04* (2009.01)
*H04W 72/12* (2009.01)
*H04W 74/02* (2009.01)
*H04W 92/18* (2009.01)

(52) U.S. Cl.
CPC ..... *H04W 72/044* (2013.01); *H04W 72/1242* (2013.01); *H04W 72/1247* (2013.01); *H04W 72/1289* (2013.01); *H04W 74/02* (2013.01); *H04W 92/18* (2013.01)

(58) Field of Classification Search
CPC .............. H04W 72/044; H04W 72/10; H04W 72/1242; H04W 72/1247; H04W 72/1289; H04W 74/02; H04W 92/18
See application file for complete search history.

(56) References Cited

U.S. PATENT DOCUMENTS

| | | | |
|---|---|---|---|
| 2017/0019887 A1 | 1/2017 | Jiang et al. | |
| 2018/0049073 A1* | 2/2018 | Dinan | H04W 72/1263 |
| 2018/0049193 A1* | 2/2018 | Belleschi | H04W 72/0446 |
| 2018/0049225 A1* | 2/2018 | Lee | H04W 36/0055 |
| 2018/0092122 A1* | 3/2018 | Babaei | H04W 72/14 |
| 2018/0103460 A1* | 4/2018 | Sharma | H04W 72/14 |
| 2018/0132208 A1* | 5/2018 | Pan | H04W 72/0406 |
| 2019/0045521 A1* | 2/2019 | Hong | H04W 56/001 |
| 2019/0182644 A1 | 6/2019 | Zheng et al. | |
| 2019/0313375 A1* | 10/2019 | Loehr | H04W 72/04 |
| 2020/0305167 A1* | 9/2020 | Freda | H04W 72/0446 |

FOREIGN PATENT DOCUMENTS

| | | |
|---|---|---|
| CN | 106028386 A | 10/2016 |
| CN | 106162914 A | 11/2016 |
| CN | 106304360 A | 1/2017 |
| WO | 2010018990 A2 | 2/2010 |
| WO | 2017148231 A1 | 9/2017 |

OTHER PUBLICATIONS

ZTE, "SPS enhancements for V2X over Uu",3GPP TSG-RAM WG2 Meeting #95 R2-165402,Gteborg, Sweden, Aug. 22-26, 2016,total 4 pages.

Huawei et al., "Further Discussion of SPS over Sidelink",3GPP TSG HAN WG2 Meeting #95-bis R2-166300,Kaohsiung Oct. 10-14, 2016,total 6 pages.

3GPP TS 36.331 V14.2.2 (Apr. 2017);3rd Generation Partnership Project;Technical Specification Group Radio Access Network,Evolved Universal Terrestrial Radio Access (E-UTRA); Radio Resource Control (RRC);Protocol specification (Release 14);total 721 pages.

* cited by examiner

DATA TRANSMISSION METHOD AND APPARATUS

CROSS-REFERENCE TO RELATED APPLICATIONS

This application is a continuation of International Application No. PCT/CN2018/091325, filed on Jun. 14, 2018, which claims priority to Chinese Patent Application No. 201710525023.8, filed on Jun. 30, 2017. The disclosures of the aforementioned applications are herein incorporated by reference in their entireties.

TECHNICAL FIELD

This application relates to communications technologies, and in particular, to a data transmission method and apparatus.

BACKGROUND

With development of communications technologies, various types of device-to-device communication are widely applied, such as device-to-device (D2D) communication, vehicle-to-vehicle (V2V) communication, vehicle-to-infrastructure (V2I) communication, and vehicle-to-pedestrian communication.

In the prior art, when uplink data needs to be transmitted, user equipment (UE) sends an uplink scheduling request (SR) to a base station. When the uplink SR is detected, the base station allocates, to the UE, sufficient resources for the UE to send a buffer status report (BSR). The UE notifies, by using the BSR, the base station of a quantity of pieces of data that is in a buffer of the UE and that needs to be sent. The base station schedules a resource for the UE, and activates resource allocation explicitly through a physical downlink control channel (PDCCH). The UE periodically transmits the uplink data on the allocated resource at a radio resource control (RRC) configuration period.

However, when data is transmitted in the prior art, there is a problem of a relatively long transmission delay.

SUMMARY

This application provides a data transmission method and apparatus, to reduce a data transmission delay.

According to a first aspect, this application provides a data transmission method. The method includes: determining, by UE, SPS assistance information based on N data packets at layer 2; if a preset condition is satisfied, sending, by the UE, the SPS assistance information to a base station; receiving, by the UE, an SPS resource sent by the base station; and performing, by the UE, data transmission by using the SPS resource.

The SPS assistance information includes a frame number and a subframe number that are corresponding to a moment offset. N is an integer greater than or equal to 1. Service features corresponding to the N data packets are the same, and the service feature includes at least a period configured by the base station for the UE.

The UE determines the SPS assistance information based on the N data packets at layer 2, where the SPS assistance information includes the frame number and the subframe number that are corresponding to the moment offset, the service features corresponding to the N data packets are the same, and the service feature includes at least the period configured by the base station for the UE. Therefore, compared with the prior art, the moment offset of the data packets can be accurately predicted, and then the SPS assistance information is determined based on the frame number and the subframe number that are corresponding to the relatively accurate moment offset, to reduce impact of data packet fluctuation on a transmission delay. In addition, in this application, the UE can obtain the SPS resource without reporting an SR, so that the data transmission delay can be reduced.

In one embodiment, the determining, by UE, SPS assistance information based on N data packets at layer 2 may include: obtaining, by the UE, the moment offset based on offset moments at which the N data packets at layer 2 arrive at a logical channel, where the moment offset is an average of the offset moments, a minimum arrival offset moment, a maximum arrival offset moment, a latest arrival moment, or any one of N arrival moments at which the N data packets arrive at the logical channel, and the logical channel is used to provide a transmission service for data.

In one embodiment, when the moment offset is the average of the offset moments at which the N data packets arrive at the logical channel, the obtaining, by the UE, the moment offset based on offset moments at which the N data packets at layer 2 arrive at a logical channel may include: obtaining, by the UE, N−1 mapping offset moments by adding period differences between arrival moments of N−1 data packets and an arrival moment of an $M^{th}$ data packet and the offset moments at which the N−1 data packets in the N data packets arrive at the logical channel or subtracting period differences between arrival moments of N−1 data packets and an arrival moment of an $M^{th}$ data packet from the offset moments at which the N−1 data packets in the N data packets arrive at the logical channel; obtaining, by the UE, an average of the N−1 mapping offset moments; and determining, by the UE, that a sum of the arrival moment of the $M^{th}$ data packet and the average of the N−1 mapping offset moments as the moment offset, where the N data packets include the $M^{th}$ data packet and the N−1 data packets, and the $M^{th}$ data packet is any one of the N data packets.

In one embodiment, the preset condition may be any one of the following conditions:

condition 1: the UE sends the SPS assistance information to the base station for the first time;

condition 2: when the UE sends the SPS assistance information to the base station not for the first time, the UE determines a difference between a start moment of SPS scheduling and an arrival moment of a data packet, and the difference is greater than or equal to a preset threshold for consecutive $M_1$ times, where $M_1$ is a positive integer, and N is greater than or equal to $M_1$;

condition 3: the UE determines an arrival period of a data packet, arrival periods of consecutive $M_2$ data packets are different from the period configured by the base station for the UE, and the arrival periods of the $M_2$ data packets are the same, where $M_2$ is a positive integer, N is greater than or equal to $M_2$, and the arrival period is an actual period of the data packet; and condition 4: the UE determines a to-be-sent TB size of a service corresponding to the N data packets in a buffer, and index corresponding to the to-be-sent TB size changes for consecutive $M_3$ times, where $M_3$ is a positive integer, and N is greater than or equal to $M_3$.

In one embodiment, before the performing, by the UE, data transmission by using the SPS resource, the data transmission method may further include: if the UE determines that the SPS resource is insufficient to carry the to-be-sent transport block size, performing, by the UE, resource allocation based on the to-be-sent transport block size in any one of the following manners: an AMC manner, a manner of extending a quantity of RBs, a resource overlapping manner, and a fragmentation manner, where the resource overlapping manner is used to indicate that resources used for transmitting data of different UEs partially or completely overlap.

In one embodiment, before the receiving, by the UE, the SPS resource sent by the base station, the data transmission method may further include: sending, by the UE, a BSR to the base station, where the BSR includes a volume of corresponding to-be-transmitted data of a non-SPS activated process in the buffer, and the process has data on the logical channel.

In one embodiment, after the receiving, by the UE, the SPS resource sent by the base station, the data transmission method may further include: determining, by the UE, a waiting delay threshold based on a priority corresponding to the SPS assistance information; and determining, by the UE, that a first difference is less than or equal to the waiting delay threshold, where the first difference is the difference between the moment at which the data packet arrives at the logical channel and the start moment of the SPS scheduling.

In one embodiment, the data transmission method may further include: if the UE determines that the first difference is greater than the waiting delay threshold, performing, by the UE, data transmission by using a resource selected through dynamic scheduling; or if the UE determines that the first difference is greater than the waiting delay threshold, performing, by the UE, data transmission by using a resource selected through terminal autonomous resource selection.

In one embodiment, the data transmission method may further include: receiving, by the UE, a system message or radio resource control RRC signaling sent by the base station, where the system message or the RRC signaling is used to configure a priority for the UE, and the priority is used by UE to determine a scheduling mode, that is, the UE determines the scheduling mode based on the priority.

The scheduling mode includes a base station scheduling grant and terminal autonomous resource selection. When a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

According to a second aspect, this application provides a data transmission method. The method includes: receiving, by a base station, SPS assistance information sent by UE; allocating, by the base station, an SPS resource to the UE based on the SPS assistance information; and sending, by the base station, the SPS resource to the UE, where the SPS assistance information is determined by the UE based on N data packets at layer 2, the SPS assistance information includes a frame number and a subframe number that are corresponding to a moment offset, service features corresponding to the N data packets are the same, and the service feature includes at least a period configured by the base station for the UE.

The UE determines the SPS assistance information based on the N data packets at layer 2, where the SPS assistance information includes the frame number and the subframe number that are corresponding to the moment offset, the service features corresponding to the N data packets are the same, and the service feature includes at least the period configured by the base station for the UE. Therefore, compared with the prior art, the moment offset of the data packets can be accurately predicted, and then the SPS assistance information is determined based on the frame number and the subframe number that are corresponding to the relatively accurate moment offset, to reduce impact of data packet fluctuation on a transmission delay. In addition, in this application, the UE can obtain the SPS resource without reporting an SR, so that the data transmission delay can be reduced.

In one embodiment, the SPS assistance information may further include a priority and a period. In this case, the allocating, by the base station, an SPS resource to the UE based on the SPS assistance information may be specifically: determining, by the base station, a start moment of SPS scheduling based on the frame number and the subframe number that are corresponding to the moment offset and a preset delay offset; determining, by the base station, a waiting delay threshold based on the priority; determining, by the base station in a time domain range corresponding to the waiting delay threshold, an SPS scheduling window based on the start moment of the SPS scheduling, where the SPS scheduling window is used to indicate time-frequency domain resources that are used by the UE to respectively send control information and data information on a PSCCH and a PSSCH in one SPS period; and reserving, by the base station, the SPS resource at a fixed time domain and frequency domain location based on the SPS scheduling window and the period.

In one embodiment, the data transmission method may further include: sending, by the base station, a system message or radio resource control RRC signaling to the UE, where the system message or the RRC signaling is used to configure a priority for the UE, and the priority is used by the UE to determine a scheduling mode, that is, the UE determines the scheduling mode based on the priority.

The scheduling mode includes a base station scheduling grant and terminal autonomous resource selection. When a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

In one embodiment, before the allocating, by the base station, an SPS resource to the UE, the data transmission method may further include: receiving, by the base station, a BSR sent by the UE, where the BSR includes only a volume of corresponding to-be-transmitted data of a non-SPS activated process in a buffer, and the process has data on the logical channel.

According to a third aspect, this application provides a data transmission apparatus, integrated into UE. The data transmission apparatus includes: a determining module, a judging module, a sending module, and a receiving module. The determining module is configured to determine SPS assistance information based on N data packets at layer 2. In one embodiment, the SPS assistance information includes a frame number and a subframe number that are corresponding to a moment offset. N is an integer greater than or equal to 1. Service features corresponding to the N data packets are the same, and the service feature includes at least a period configured by the base station for the UE. The judging module is configured to determine whether a preset condition is satisfied. The sending module is configured to:

if a result output by the judging module is "a preset condition is satisfied", send the SPS assistance information determined by the determining module to the base station. The receiving module is configured to receive an SPS resource sent by the base station. The sending module is further configured to perform data transmission by using the SPS resource.

In one embodiment, the determining module may be specifically configured to: obtain the moment offset based on offset moments at which the N data packets at layer 2 arrive at a logical channel, where the moment offset may be an average of the offset moments, a minimum arrival offset moment, a maximum arrival offset moment, a latest arrival moment, or any one of N arrival moments at which the N data packets arrive at the logical channel, and the logical channel is used to provide a transmission service for data.

In one embodiment, when the moment offset is the average of the offset moments at which the N data packets arrive at the logical channel, the determining module may be specifically configured to: obtain N−1 mapping offset moments by adding period differences between arrival moments of N−1 data packets and an arrival moment of an $M^{th}$ data packet and the offset moments at which the N−1 data packets in the N data packets arrive at the logical channel or subtract period differences between arrival moments of N−1 data packets and an arrival moment of an $M^{th}$ data packet from the offset moments at which the N−1 data packets in the N data packets arrive at the logical channel; obtain an average of the N−1 mapping offset moments; and determine a sum of the arrival moment of the $M^{th}$ data packet and the average of the N−1 mapping offset moments as the moment offset. The N data packets include the $M^{th}$ data packet and the N−1 data packets, and the $M^{th}$ data packet is any one of the N data packets.

In one embodiment, the preset condition may be any one of the following conditions:
 condition 1: the sending module sends the SPS assistance information to the base station for the first time;
 condition 2: when the sending module sends the SPS assistance information to the base station not for the first time, the judging module determines a difference between a start moment of SPS scheduling and an arrival moment of a data packet, and the difference is greater than or equal to a preset threshold for consecutive $M_1$ times, where $M_1$ is a positive integer, and N is greater than or equal to $M_1$;
 condition 3: the judging module determines an arrival period of a data packet, arrival periods of consecutive $M_2$ data packets are different from the period configured by the base station for the UE, and the arrival periods of the $M_2$ data packets are the same, where $M_2$ is a positive integer, N is greater than or equal to $M_2$, and the arrival period is an actual period of the data packet; and
 condition 4: the judging module determines a to-be-sent TB size of a service corresponding to the N data packets in a buffer, and index corresponding to the to-be-sent TB size changes for consecutive $M_3$ times, where $M_3$ is a positive integer, and N is greater than or equal to $M_3$.

In one embodiment, the data transmission apparatus may further include a resource allocation module. The resource allocation module may be configured to: before the sending module performs data transmission by using the SPS resource, if determining that the SPS resource is insufficient to carry the to-be-sent transport block size, perform resource allocation based on the to-be-sent transport block size in any one of the following manners: an AMC manner, a manner of extending a quantity of RBs, a resource overlapping manner, and a fragmentation manner, where the resource overlapping manner is used to indicate that resources used for transmitting data of different UEs partially or completely overlap.

In one embodiment, the sending module may be further configured to: before the receiving module receives the SPS resource sent by the base station, send a BSR to the base station. The BSR includes a volume of corresponding to-be-transmitted data of a non-SPS activated process in the buffer, and the process has data on the logical channel.

In one embodiment, the determining module may be further configured to: after the receiving module receives the SPS resource sent by the base station, determine a waiting delay threshold based on a priority corresponding to the SPS assistance information; and determine that a first difference is less than or equal to the waiting delay threshold, where the first difference is the difference between the moment at which the data packet arrives at the logical channel and the start moment of the SPS scheduling.

In one embodiment, the determining module may be further configured to determine that the first difference is greater than the waiting delay threshold. In this case, the sending module may be further configured to: if the determining module determines that the first difference is greater than the waiting delay threshold, perform data transmission by using a resource selected through dynamic scheduling; or the sending module may be further configured to: if the determining module determines that the first difference is greater than the waiting delay threshold, perform data transmission by using a resource selected through terminal autonomous resource selection.

In one embodiment, the receiving module may be further configured to receive a system message or RRC signaling sent by the base station. The system message or the RRC signaling may be used to configure a priority for the UE, and the priority is used by the determining module to determine a scheduling mode. The scheduling mode includes a base station scheduling grant and terminal autonomous resource selection. When a priority of a data packet of the UE is higher than the priority configured by the base station for the UE, the determining module determines that the scheduling mode is the base station scheduling grant; or when a priority of a data packet of the UE is equal to or lower than the priority configured by the base station for the UE, the determining module determines that the scheduling mode is the terminal autonomous resource selection.

For beneficial effects of the data transmission apparatus provided in the third aspect and the embodiments of the third aspect, refer to the beneficial effects brought by the first aspect and the embodiments of the first aspect, and details are not described herein again.

According to a fourth aspect, this application provides a data transmission apparatus, integrated into a base station. The data transmission apparatus includes: a receiving module, a resource allocation module, and a sending module. The receiving module is configured to receive SPS assistance information sent by UE. The SPS assistance information is determined by the UE based on N data packets at layer 2. The SPS assistance information includes a frame number and a subframe number that are corresponding to a moment offset. Service features corresponding to the N data packets are the same, and the service feature includes at least a period configured by the base station for the UE. The resource allocation module is configured to allocate an SPS resource to the UE based on the SPS assistance information received by the receiving module. The sending module is configured to send the SPS resource to the UE.

In one embodiment, the SPS assistance information may further include a priority and a period. In this implementation, the resource allocation module may be specifically configured to: determine a start moment of SPS scheduling based on the frame number and the subframe number that are corresponding to the moment offset and a preset delay offset; determine a waiting delay threshold based on the priority; determine, in a time domain range corresponding to the waiting delay threshold, an SPS scheduling window based on the start moment of the SPS scheduling, where the SPS scheduling window is used to indicate time-frequency domain resources that are used by the UE to respectively send control information and data information on a PSCCH and a PSSCH in one SPS period; and reserve the SPS resource at a fixed time domain and frequency domain location based on the SPS scheduling window and the period.

In one embodiment, the sending module may be further configured to: send a system message or RRC signaling to the UE. The system message or the RRC signaling is used to configure a priority for the UE. The priority is used by the UE to determine a scheduling mode. The scheduling mode includes a base station scheduling grant and terminal autonomous resource selection. When a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

In one embodiment, the receiving module may be further configured to: before the resource allocation module allocates the SPS resource to the UE based on the SPS assistance information, receive a BSR sent by the UE. The BSR includes a volume of corresponding to-be-transmitted data of a non-SPS activated process in a buffer, and the process has data on the logical channel.

For beneficial effects of the data transmission apparatus provided in the fourth aspect and the embodiments of the fourth aspect, refer to the beneficial effects brought by the second aspect and the embodiments of the second aspect, and details are not described herein again.

Based on the first aspect to fourth aspect in this application:

In one embodiment, the SPS resource is included in the SPS scheduling window. The SPS scheduling window is used to indicate time-frequency domain resources that are used by the UE to respectively send control information and data information on a PSCCH and a PSSCH in one SPS period.

In one embodiment, there may be at least one SPS scheduling window. The at least one SPS scheduling window is corresponding to one SPS period, and the at least one SPS scheduling window is mutually staggered in time domain. Alternatively, when the at least one SPS scheduling window overlaps in time domain, the at least one SPS scheduling window is mutually staggered in frequency domain. Time-frequency domain resources corresponding to a plurality of SPS processes of the UE are allocated in the plurality of SPS scheduling windows.

According to a fifth aspect, this application provides a data transmission apparatus, integrated into UE. The data transmission apparatus includes: a processor, a memory, a transmitter, and a receiver. The transmitter and the receiver are coupled to the processor, the processor controls a sending action of the transmitter, and the processor controls a receiving action of the receiver. The memory is configured to store computer executable program code, and the program code includes an instruction. When the processor executes the instruction, the instruction enables the data transmission apparatus to perform the data transmission method according to the first aspect and the embodiments of the first aspect.

According to a sixth aspect, an embodiment of this application provides a data transmission apparatus, integrated into a base station. The data transmission apparatus includes: a processor, a memory, a transmitter, and a receiver. The transmitter and the receiver are coupled to the processor, the processor controls a sending action of the transmitter, and the processor controls a receiving action of the receiver. The memory is configured to store computer executable program code, and the program code includes an instruction. When the processor executes the instruction, the instruction enables the data transmission apparatus to perform the data transmission method according to the second aspect and the embodiments of the second aspect.

According to a seventh aspect, an embodiment of this application provides a data transmission apparatus, integrated into UE. The data transmission apparatus includes at least one processing element (or a chip) configured to perform the method according to the first aspect.

According to an eighth aspect, an embodiment of this application provides a data transmission apparatus, integrated into a base station. The data transmission apparatus includes at least one processing element (or a chip) configured to perform the method according to the second aspect.

According to a ninth aspect, an embodiment of this application provides a program. When executed by a processor, the program is configured to perform the method according to the first aspect.

According to a tenth aspect, an embodiment of this application provides a program. When executed by a processor, the program is configured to perform the method according to the second aspect.

According to an eleventh aspect, an embodiment of this application provides a program product, for example, a computer-readable storage medium, including the program in the ninth aspect.

According to a twelfth aspect, an embodiment of this application provides a program product, for example, a computer-readable storage medium, including the program according to the tenth aspect.

According to a thirteenth aspect, an embodiment of this application provides a computer-readable storage medium. The computer-readable storage medium stores an instruction. When the instruction is run on a computer, the computer is enabled to perform the method according to the first aspect.

According to a fourteenth aspect, an embodiment of this application provides a computer-readable storage medium. The computer-readable storage medium stores an instruction. When the instruction is run on a computer, the computer is enabled to perform the method in the second aspect.

These aspects and another aspect of this application will be clearer and easier to understand in descriptions of the following (a plurality of) embodiments.

BRIEF DESCRIPTION OF DRAWINGS

FIG. 1 shows a network architecture to which an embodiment of this application is applicable to;

FIG. 2 shows another network architecture to which an embodiment of this application is applicable to;

DESCRIPTION OF EMBODIMENTS

The technologies described in this application may be applied to a long term evolution (LTE) system or another wireless communications system that uses various wireless access technologies, for example, a system that uses access technologies such as code division multiple access, frequency division multiple access, time division multiple access, orthogonal frequency division multiple access, and single carrier frequency division multiple access. In addition, the technologies may be alternatively applied to a subsequent evolved system of an LTE system, such as a fifth-generation 5G system.

Vehicle to everything (V2X) exchange/communication is a new intelligent transportation service for inter-vehicle communication. A support architecture includes a PC5 based V2X architecture that is based on vehicle-to-vehicle direct communication and a Uu based V2X architecture that is based on network interaction.

Figure 1:
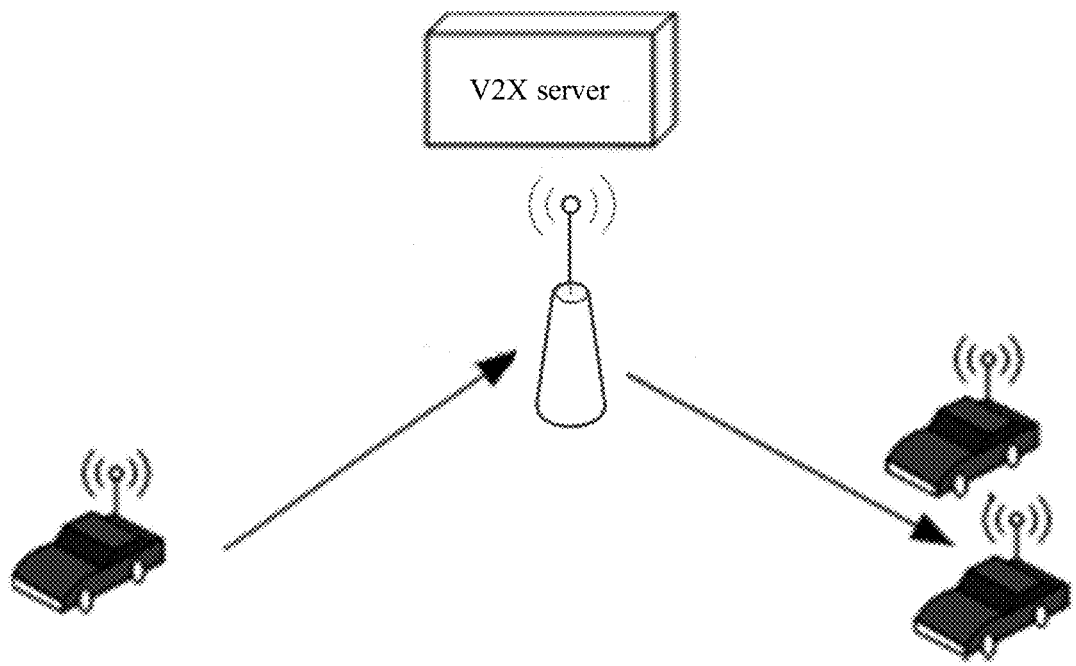

In the Uu based V2X architecture, V2X is used as a new service of a conventional cellular network, and is focused to reduce an end-to-end delay to ensure V2X service experience. Details are shown in FIG. 1. Vehicle-to-vehicle communication is performed based on a Uu interface between a vehicle and a base station.

Figure 2:
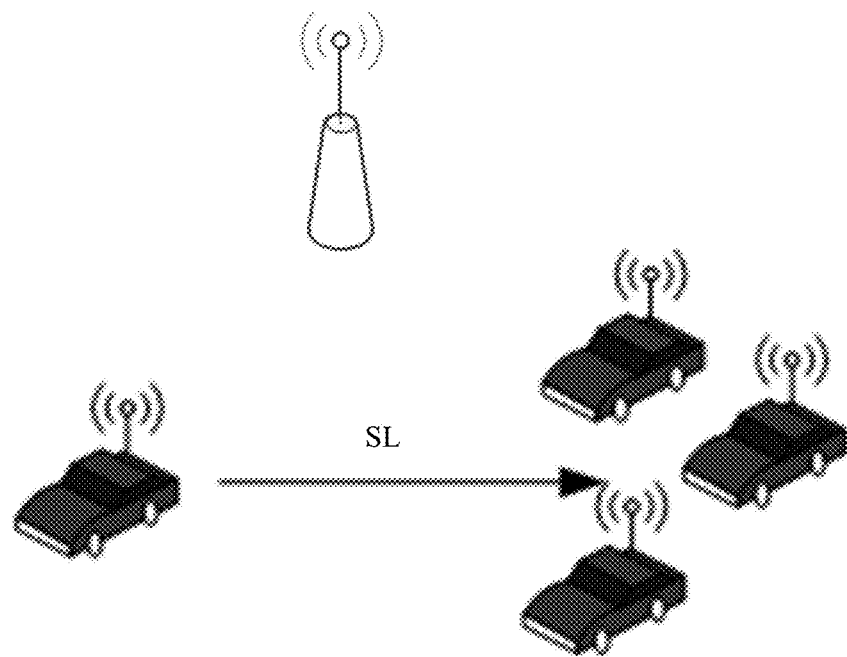

The PC5 based V2X architecture is an architecture in which communication is implemented through a newly added PC5 interface that is used for direct communication between vehicles or between a vehicle and infrastructure, as shown in FIG. 2.

In a D2D communications system, inter-terminal communication may be performed directly without being transferred by a network side device. The network side device may perform resource configuration, scheduling, coordination, and the like, to assist in direct communication between the terminals. Generally, the network side device assigns a resource pool to the D2D communications terminal to transmit D2D communication data. The resource pool may be understood as a set of time-frequency resources, including a resource pool used for transmitting and a resource pool used for receiving. The network side device configures different resource pools for the D2D communications terminal in a broadcast mode, such as a scheduling assignment (SA) resource pool and a data resource pool, and each resource pool has a fixed period. The D2D communications terminal may use, in two modes, the time-frequency resources in the resource pool assigned by the network side device. In one mode, the D2D communications terminal uses a determined time-frequency resource that is allocated by the network side device to each D2D communications terminal and that is in the resource pool, that is, a base station scheduling grant. In the other mode, the D2D communications terminal autonomously randomly selects a time-frequency resource from the resource pool. The resource pool is configured by a network side or preconfigured, that is, terminal autonomous resource selection. The D2D communications terminal selects a time-frequency resource from the resource pool in one of the foregoing two modes, and then, transmits D2D communication data at the fixed period of the resource pool.

As one of two major technical camps for implementing V2X, LTE-V is an evolution technology that is oriented to intelligent transportation and internet of vehicles applications and that is based on a 4G long term evolution (LTE) system. In LTE-V, resource allocation is classified into two modes: a base station scheduling grant (Mode 3) and terminal autonomous resource selection (Mode 4). In terms of the base station scheduling grant, transmission may be performed through a PC5 interface and a Uu interface, and the base station scheduling grant is further classified into dynamic scheduling and semi-persistent scheduling (SPS). In terms of the terminal autonomous resource selection, transmission may be performed in an in-coverage (IC) scenario of the base station.

A V2X application-layer service model is affected by dynamic factors such as a vehicle speed, acceleration, and turning, and cases in which an event triggers a vehicle to send a message may alternately occur, but generally the cases are regular, and a safety-type message within a specific range of sizes is sent at a particular period, which is suitable for SPS. For the base station scheduling grant, to save PDCCH control information, especially when a limited PDCCH becomes a main bottleneck, it is considered that an SPS solution is used in the IC scenario. To be specific, the base station periodically sends a PC5 interface-based or a Uu interface-based vehicle-to-vehicle communication safety message when the base station performs a PDCCH grant once. The base station can ensure reliability and a low delay of quality of service (QoS) of a high-priority vehicle. For the terminal autonomous resource selection, "sensing" is used to implement SPS in the Mode 4.

PC5 interface-based base station scheduling grant SPS means that in a V2X data transmission process, the base station indicates current scheduling information to vehicle user equipment (VUE) by using a PDCCH during initial scheduling, and the VUE demodulates the current scheduling information, to identify whether the SPS is PC5 interface-based semi-persistent scheduling or Uu interface-based semi-persistent scheduling. At a period of SPS configuration parameters, if transmission is performed through the PC5 interface, the VUE periodically sends an SA on a corresponding physical sidelink control channel (PSCCH) time-frequency resource and sends data on a corresponding physical sidelink shared channel (PSSCH) time-frequency domain resource. The VUE supports SPS processes of a maximum of eight V2X services, and the configuration period may be specifically 20 ms, 50 ms, 100 ms, 200 ms, . . . , or 1000 ms.

For SPS transmission, the VUE can fully use a feature of periodicity of data packet arrival; granting is performed once, and periodic usage is achieved, thereby effectively saving PDCCH resources used for scheduling indication, reducing impact on an existing LTE network, supporting scheduling of more users equipments having a V2X service, and ensuring high reliability of transmission performance of the user equipments. For the PC5 interface-based base station scheduling grant SPS, the VUE and the base station exchange control signaling through the Uu interface, and VUEs transmit data information of a V2X message to each other through the PC5 interface. After the SPS is enabled, once a data packet of the V2X service changes in a period and at an arrival moment, a PC5 interface needs to be reselected to allocate a resource through SPS. In this case, the VUE collects statistics on a rule of data packets, and reports related information, such as a priority (ProSe Per-Packet Priority, PPPP), a period, a moment offset, a maximum transport block (TB) size, and a logical channel identifier (LCID) (Uu) of a ProSe packet, to the base station, and then the base station selects a PC5 interface resource based on a QoS priority to activate or reactivate the SPS.

The following describes an objective of base station scheduling grant SPS in the LTE-V.

1. Compared with the dynamic scheduling (Mode 3): (a) PDCCH resource overheads are reduced; (b) an end-to-end transmission delay of a V2X service through the base station scheduling is reduced; and (c) signaling exchanged between the VUE and the base station is reduced.

2. Compared with the terminal autonomous resource selection (Mode 4): reliability of a V2X service with a high priority is ensured.

The following describes in detail a data transmission method provided in this application by using a detailed embodiment.

Figure 3:
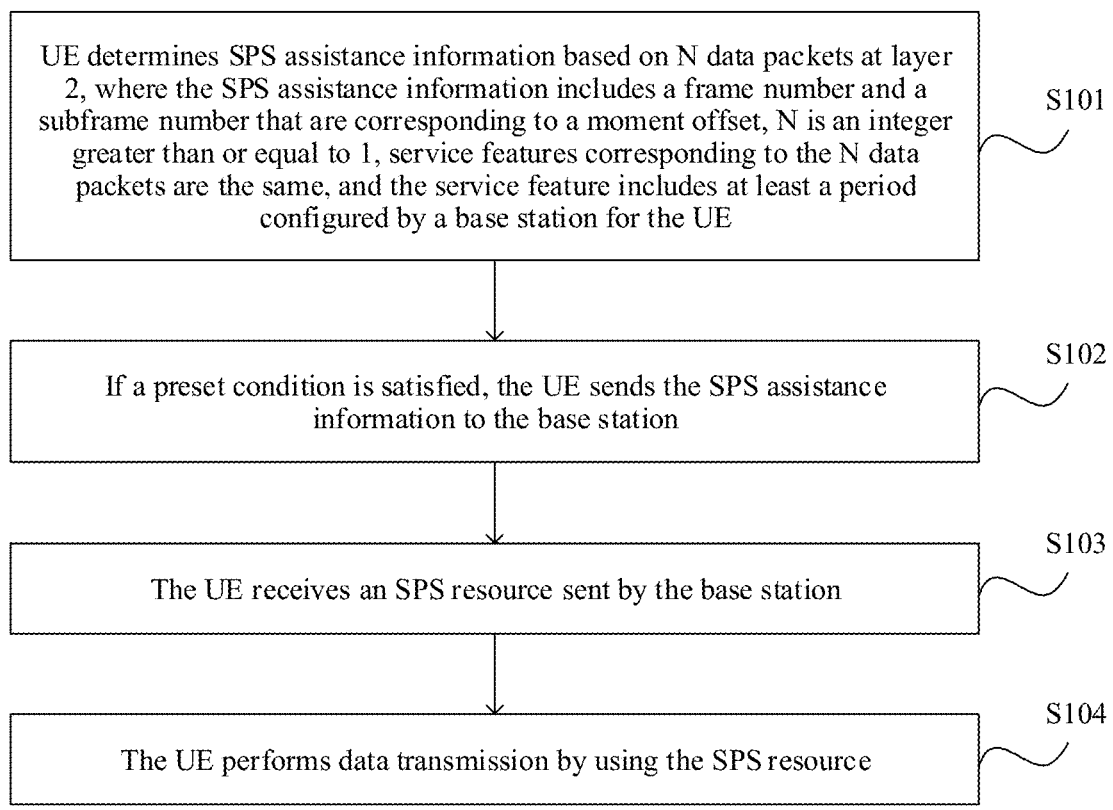
FIG. 3 is a schematic flowchart of a data transmission method according to an embodiment of this application.

FIG. 3 is a schematic flowchart of a data transmission method according to an embodiment of this application. The method may be performed by a data transmission apparatus. The apparatus may be UE, and may be, for example, VUE. However, the apparatus is not limited to the VUE in this application. Alternatively, the apparatus may be integrated into UE. As shown in FIG. 3, the method includes the following operations.

S101. The UE determines SPS assistance information based on N data packets at layer 2, where the SPS assistance information includes a frame number and a subframe number that are corresponding to a moment offset, N is an integer greater than or equal to 1, service features corresponding to the N data packets are the same, and the service feature includes at least a period configured by a base station for the UE.

At an application layer of the UE, for a V2X service, a data packet is generated at a period. Afterwards, the data packet is transferred from the application layer to layer 2 (L2), such as a packet data convergence protocol (PDCP) layer, a radio link control (RLC) protocollayer, and a media access control (MAC) layer. Because a moment at which the data packet arrives at L2 fluctuates in a specific range, the UE cannot accurately predict an arrival moment of the data packet. Therefore, in the embodiments of this application, the UE first determines the SPS assistance information based on the N data packets at L2, where the SPS assistance information includes the frame number and the subframe number that are corresponding to the moment offset.

N is an integer greater than or equal to 1, and service features corresponding to the N data packets are the same. The service feature includes at least a period configured by the base station for the UE. Further, the service feature may further include information such as a priority and a maximum TB size (Tbsize). The frame number ranges from 0 to 10239, and the subframe number ranges from 0 to 9.

In addition, the SPS assistance information may further include any one or more of the foregoing service features.

S102. If a preset condition is satisfied, the UE sends the SPS assistance information to the base station.

The preset condition may be configured by the base station for the UE. Alternatively, the base station configures the UE to report the SPS assistance information when a specific preset condition is satisfied.

For example, the preset condition may be any one of the following conditions:
  condition 1: the UE sends the SPS assistance information to the base station for the first time;
  condition 2: when the UE sends the SPS assistance information to the base station not for the first time, the UE determines a difference between a start moment of SPS scheduling and an arrival moment of a data packet, and the difference is greater than or equal to a preset threshold for consecutive $M_1$ times, where $M_1$ is a positive integer, and N is greater than or equal to $M_1$;
  condition 3: the UE determines an arrival period of a data packet, arrival periods of consecutive $M_2$ data packets are different from the period configured by the base station for the UE, and the arrival periods of the $M_2$ data packets are the same, where $M_2$ is a positive integer, N is greater than or equal to $M_2$, and the arrival period is an actual period of the data packet; and
  condition 4: the UE determines a to-be-sent TB size of a service corresponding to the N data packets in a buffer, and index corresponding to the to-be-sent TB size changes for consecutive $M_3$ times, where $M_3$ is a positive integer, and N is greater than or equal to $M_3$.

Referring to an existing protocol, the UE may send the SPS assistance information to the base station by using radio resource control (RRC) signaling specifically.

Correspondingly, the base station receives the SPS assistance information sent by the UE.

After receiving the SPS assistance information, the base station determines a scheduling status of the UE. The scheduling status includes SPS and dynamic scheduling, and the SPS includes SPS activation, SPS deactivation, and SPS reactivation.

For example, the scheduling status is classified into the following four statuses:
  V2XScheUserStatus=0, indicating that the user scheduling status is dynamic scheduling;
  V2XScheUserStatus=1, indicating that the user scheduling status is SPS activation or SPS reactivation;
  V2XScheUserStatus=2, indicating that the user scheduling status is SPS deactivation; and
  V2XScheUserStatus=3, indicating that the user scheduling status is that scheduling is not performed in a current scheduling period (Transmission Time Interval, TTI).

Subsequently, the base station allocates an SPS resource to the UE based on the SPS assistance information.

Based on an existing procedure in which the UE reports an SR, and the base station finally delivers downlink control information (DCI) 5A, there is a problem of an excessively long SPS delay. Therefore, in this application, the base station directly delivers the DCI5A based on the SPS assistance information that is reported by the UE and that includes the frame number and the subframe number, to determine the SPS resource and shorten a V2X scheduling delay.

The SPS resource may be a time-frequency domain resource used for transmission through a PC5 interface, and/or a time-frequency domain resource used for transmission through a Uu interface. It should be noted that, a signaling exchange procedure is performed between the base station and the UE through the Uu interface, and control information and data information are transmitted between UEs through the PC5 interface.

For how the base station allocates the SPS resource to the UE, refer to subsequent embodiments, and details are not described herein.

Then, the base station sends the SPS resource to the UE.

S103. The UE receives the SPS resource sent by the base station.

In one embodiment, the UE receives PDCCH control information sent by the base station, and the PDCCH control information includes an SPS resource.

Resource allocation needs to be agreed on by both parties of the UE and the base station, that is, a resource allocation manner on which both the UE and the base station agree is used. Therefore, the base station uses SPS for a service of the UE, and needs to notify the UE of an SPS resource allocated to the UE, and the UE confirms the SPS resource.

After the SPS resource is configured for the UE, the SPS resource further needs to be activated by using a PDCCH scrambled by using an SPS C-RNTI. The base station activates or releases the SPS resource of the UE by using the PDCCH scrambled by using the SPS C-RNTI.

Figure 4:
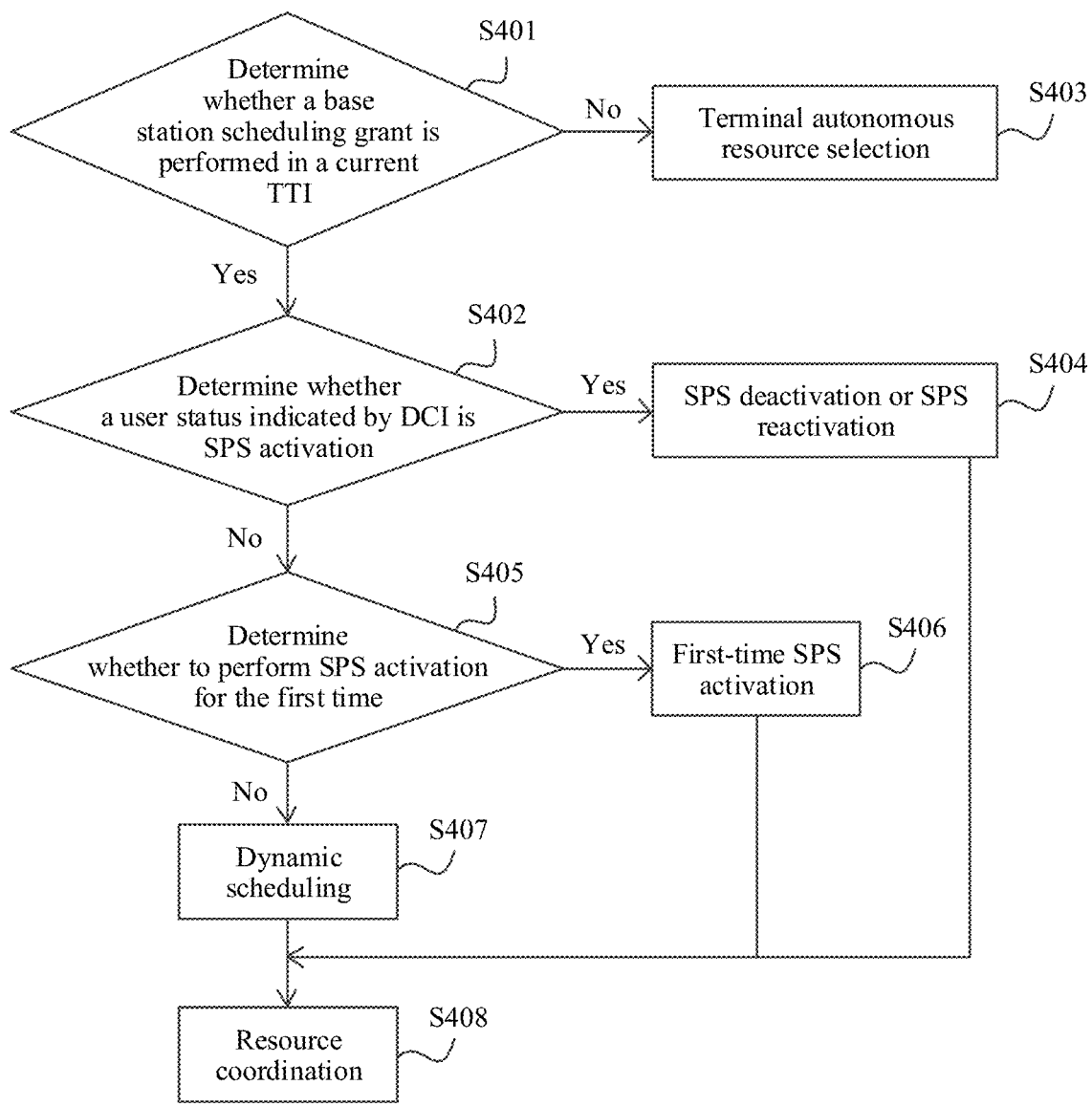
FIG. 4 is a schematic diagram of a rule of resource allocation on a UE side in a data transmission method according to this application.

FIG. 4 shows a rule of resource allocation on a UE side. Referring to FIG. 4, after UE receives an SPS resource sent by a base station, the UE performs the following operations.

S401. Determine whether a base station scheduling grant is performed in a current TTI.

If the base station scheduling grant is performed in the current TTI, S402 is performed; or if the base station scheduling grant is not performed in the current TTI, S403 is performed.

S402: Determine whether a user status indicated by DCI is SPS activation.

If the user status indicated by the DCI is SPS activation, S404 is performed; or if the user status indicated by the DCI is non-SPS activation, S405 is performed.

S403. Perform terminal autonomous resource selection.

S404. Perform SPS deactivation or SPS reactivation.

Then, S408 is performed.

S405: Determine whether to perform SPS activation for the first time.

If SPS activation is performed for the first time, S406 is performed; or if SPS activation is performed not for the first time, S407 is performed.

S406. Perform SPS activation for the first time.

Then, S408 is performed.

S407. Perform dynamic scheduling.

S408. Perform resource coordination.

In one embodiment, the UE distinguishes between the dynamic scheduling or the SPS based on a scrambling manner (SL-V-RNTI and SL SPS V-RNTI) and a field in DCI5A.

The SPS specifically includes: SPS activation, SPS reactivation, and SPS deactivation, which are all explicitly indicated in the DCI5A.

SPS activation: The UE activates the SPS process based on a field value Activation/Release and an SPS index in the PDCCH (DCI5A), and performs resource allocation based on a time-frequency domain resource indicated in the DCI5A.

SPS reactivation: The UE reactivates the SPS process based on a field value Activation/Release and an SPS index in the PDCCH (DCI5A), that is, first releases an SPS process corresponding to an original SPS index, and then performs resource reallocation based on a time-frequency domain resource indicated in the DCI5A.

SPS deactivation: The UE deactivates the SPS process based on a field value Activation/Release and an SPS index in the PDCCH (DCI5A), and releases a time-frequency domain resource allocated by the base station, or the base station configures an implicit deactivation timer for the UE, where automatic deactivation is performed when the timer expires.

In one embodiment, if the UE does not receive the DCI, and a service feature corresponding to the UE does not include SPS activation, the UE performs terminal autonomous resource selection in a "sensing" manner or a "random" manner based on a resource allocation manner (or a parameter configured by the base station) of the UE.

After the SPS activation, the UE may periodically receive and send data by using a configured SPS resource.

S104. UE performs data transmission by using the SPS resource.

In one embodiment, after receiving the SPS activation in the DCI5A, the UE periodically determines, on the SPS resource allocated by the base station, whether there is data on a logical channel corresponding to the SPS process. If there is data, and the SPS resource is sufficient to carry a to-be-sent TB size, the UE sends an SA in a PSCCH resource pool, and sends the data in a PSSCH resource pool; or if there is no data, the UE sends no SA in a PSCCH resource pool, and sends no data in a PSSCH resource pool.

In the embodiments, the SPS assistance information is determined based on the N data packets at layer 2, where the SPS assistance information includes the frame number and the subframe number that are corresponding to the moment offset, the service features corresponding to the N data packets are the same, and the service feature includes at least the period configured by the base station for the UE. Compared with that in the prior art, the moment offset of the data packets can be accurately predicted, and then the SPS assistance information is determined based on the frame number and the subframe number that are corresponding to the relatively accurate moment offset, to reduce impact of data packet fluctuation on a transmission delay. In addition, in this application, the UE can obtain an SPS resource without reporting an SR, so that the data transmission delay can be reduced.

The following describes in detail the technical solutions shown in this application by using specific embodiments. It should be noted that, the following embodiments may be combined with each other, and same or similar content is not repeatedly described in different embodiments.

Figure 5:
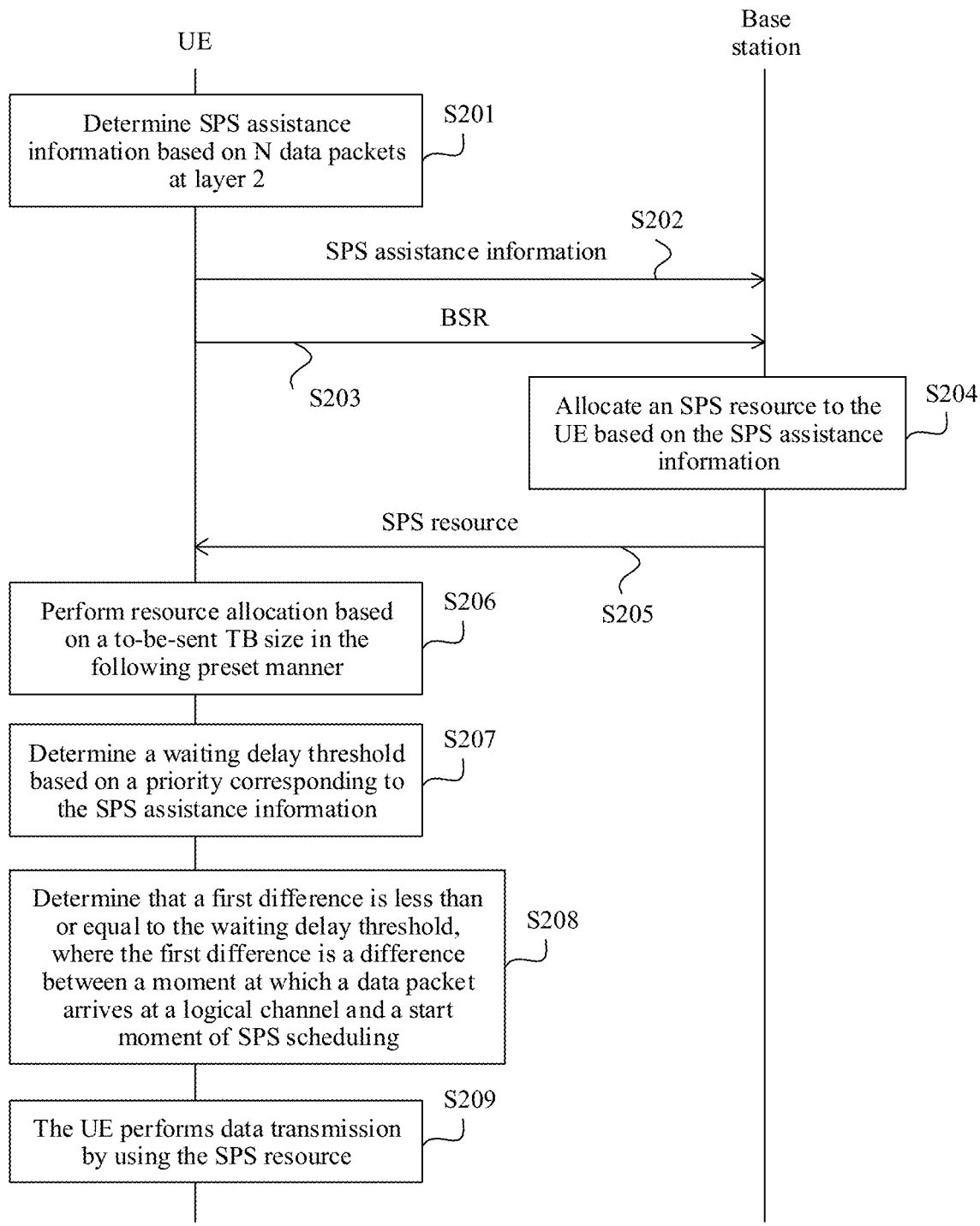
FIG. 5 is a diagram of signaling exchange in a data transmission method according to another embodiment of this application.

FIG. 5 is a diagram of signaling exchange in a data transmission method according to another embodiment of this application. Referring to FIG. 5, the data transmission method may include the following operations.

S201. UE determines SPS assistance information based on N data packets at layer 2.

In one embodiment, the operation may include: obtaining, by the UE, the moment offset based on offset moments at which the N data packets at layer 2 arrive at a logical channel. The moment offset may be an average of the offset moments, a minimum arrival offset moment, a maximum arrival offset moment, a latest arrival moment, or any one of N arrival moments at which the N data packets arrive at the logical channel, and the logical channel is used to provide a transmission service for data.

The logical channel may provide a transmission service for data of different types. For example, an STCH logical channel is used to transmit data of a V2X or D2D type, and a dedicated traffic channel (DTCH) logical channel is used to transmit data of an LTE service type, and so on.

For example, when the moment offset is the average of the offset moments at which the N data packets arrive at the logical channel, the obtaining, by the UE, the moment offset based on offset moments at which the N data packets at layer 2 arrive at a logical channel may include: obtaining, by the UE, N−1 mapping offset moments by adding period differences between arrival moments of N−1 data packets and an arrival moment of an $M^{th}$ data packet and the offset moments at which the N−1 data packets in the N data packets arrive at the logical channel or subtracting period differences between arrival moments of N−1 data packets and an arrival moment of an $M^{th}$ data packet from the offset moments at which the N−1 data packets in the N data packets arrive at the logical channel, where the N data packets include the $M^{th}$ data packet and the N−1 data packets, and the $M^{th}$ data packet is any one of the N data packets; obtaining, by the UE, an average of the N−1 mapping offset moments; and determining, by the UE, that a sum of the arrival moment of the $M^{th}$ data packet and the average of the N−1 mapping offset moments as the moment offset.

Alternatively, when the moment offset is the maximum arrival offset moment of the offset moments at which the N data packets arrive at the logical channel, the obtaining, by the UE, the moment offset based on offset moments at which the N data packets at layer 2 arrive at a logical channel may include: obtaining, by the UE, N−1 mapping offset moments by adding period differences between arrival moments of N−1 data packets and an arrival moment of an $M^{th}$ data packet and the offset moments at which the N−1 data packets in the N data packets arrive at the logical channel or subtracting period differences between arrival moments of N−1 data packets and an arrival moment of an $M^{th}$ data packet from the offset moments at which the N−1 data packets in the N data packets arrive at the logical channel, where the N data packets include the $M^{th}$ data packet and the N−1 data packets, and the $M^{th}$ data packet is any one of the N data packets; obtaining, by the UE, the maximum arrival offset moment of the N−1 mapping offset moments; and determining, by the UE, that a sum of the arrival moment of the $M^{th}$ data packet and the maximum arrival offset moment of the N−1 data packets as the moment offset.

When the moment offset is the minimum arrival offset moment, the latest arrival moment, or any one of the N arrival moments of the offset moments at which the N data packets arrive at the logical channel, refer to the foregoing description, and details are not described herein again.

When periods of data packets on a same logical channel change, new SPS assistance information needs to be re-determined.

S202. If a preset condition is satisfied, the UE sends the SPS assistance information to a base station.

For a specific description of this operation, refer to S102, and details are not described herein again.

S203. The UE sends a BSR to the base station.

The BSR includes a volume of corresponding to-be-transmitted data of a non-SPS activated process in the buffer, and the process has data on the logical channel.

This operation is an optional operation.

If there is data on a plurality of logical channels, and statuses of corresponding SPS processes include "SPS is enabled" and "SPS is disabled", the BSR reported by the UE includes only a volume of corresponding to-be-transmitted data of a non-SPS activated process in the buffer, the process has data on the logical channel, and the BSR of the logical channel waiting for an SPS scheduling window is set to 0. Alternatively, the UE performs reporting based on a normal BSR, but the base station does not perform any processing on an SL-BSR of a logical channel on which SPS is enabled.

In the prior art, when data on a logical channel in a logical channel group requires dynamic scheduling, a BSR needing to be reported by the UE includes a volume of corresponding to-be-transmitted data of the logical channel group in a buffer. However, in this application, the BSR needing to be reported by the UE includes only a volume of corresponding to-be-transmitted data of a logical channel in a buffer, where the logical channel is in the logical channel group and requires dynamic scheduling.

Figure 6A:
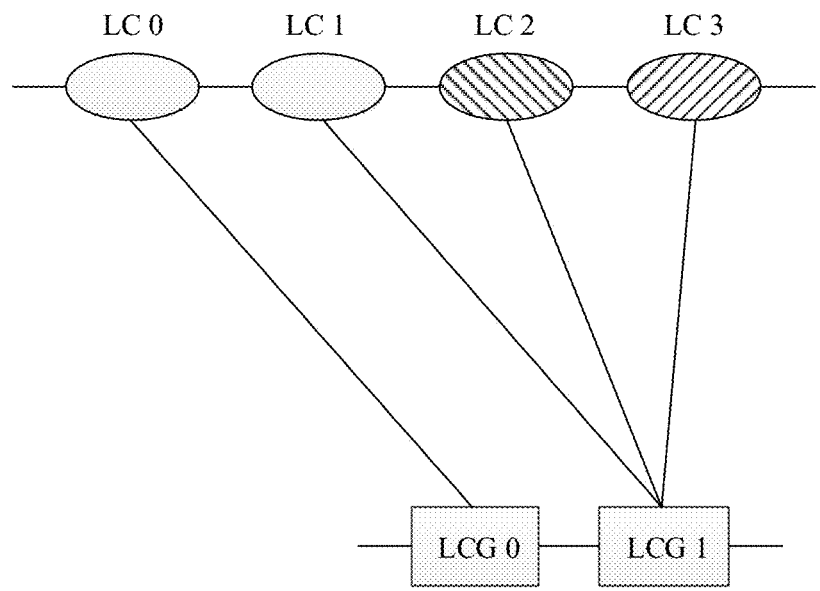
FIG. 6A and FIG. 6B are a diagram of an example of a logical channel in a data transmission method according to this application.
Figure 6B:
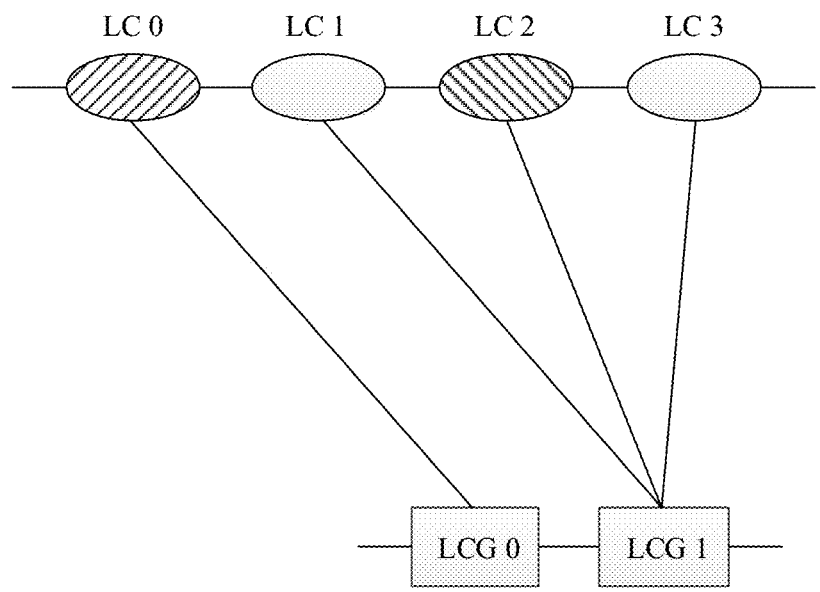

As shown in FIG. 6A and FIG. 6B, a logical channel group LCG 0 includes a logical channel LC 0, and a logical channel group LCG 1 includes a logical channel LC 1, a logical channel LC 2, and a logical channel LC 3.

In FIG. 6A, the logical channel LC 0 and the logical channel LC 1 have no data, the logical channel LC 2 has data but no SPS process is enabled thereon, and the logical channel LC 3 has data and an SPS process is enabled thereon. That is, the logical channel LC 2 requires dynamic scheduling, and the logical channel LC 3 requires SPS. In this case, the UE reports only a size of a BSR of the logical channel LC 2, and a BSR of the logical channel LC 3 is set to 0. In the figure, the logical channel LC 2 and the logical channel LC 3 that need to be scheduled belong to the same logical channel group LCG 1.

In FIG. 6B, the logical channel LC 1 and the logical channel LC 3 have no data, the logical channel LC 2 has data but no SPS process is enabled thereon, and the logical channel LC 0 has data and an SPS process is enabled thereon. That is, the logical channel LC 2 requires dynamic scheduling, and the logical channel LC 0 requires SPS. In this case, the UE reports only a size of a BSR of the logical channel LC 2, and a BSR of the logical channel LC 0 is set to 0. In the figure, the logical channel LC 2 and the logical channel LC 0 that need to be scheduled belong to different logical channel groups.

S204. The base station allocates an SPS resource to the UE based on the SPS assistance information.

In an optional implementation, the SPS assistance information may further include a priority and a period. In this implementation, the allocating, by the base station, an SPS resource to the UE may further include: determining, by the base station, a start moment of SPS scheduling based on a frame number and a subframe number that are corresponding to a moment offset and a preset delay offset; determining, by the base station, a waiting delay threshold based on the priority; determining, by the base station in a time domain range corresponding to the waiting delay threshold, an SPS scheduling window based on the start moment of the SPS scheduling, where the SPS scheduling window is used to indicate, time-frequency domain resources that are used by the UE to respectively send control information, for example, an SA, and data information on a PSCCH and a PSSCH in one SPS period; and reserving, by the base station, the SPS resource at a fixed time domain and frequency domain location based on the SPS scheduling window and the period.

The preset delay offset is greater than or equal to 0, and a unit of the preset delay offset may be millisecond (ms). For example, a value of the preset delay offset is 5 ms. The preset delay offset is set by the base station.

(a) The base station determines the start moment of the SPS scheduling based on the frame number and the subframe number that are corresponding to the moment offset and the preset delay offset.

It is set that the preset delay offset is represented by V2XSpsSchedDelayTime, and the start moment of the SPS scheduling is represented by $t_0$, $t_0$=the moment offset+V2XSpsSchedDelayTime, and
a frame number and a subframe number that are corresponding to $t_0$ are obtained.

(b) The base station determines the waiting delay threshold based on the priority included in the SPS assistance information.

Waiting delay thresholds corresponding to different priorities may be the same or different, a value of the waiting delay threshold ranges from 1 to 100, a unit is ms, and the waiting delay threshold is 10 ms by default. It is set that the waiting delay threshold is represented by $T_{maxWaitingTime}$.

(c) The base station determines, in a time domain range corresponding to the waiting delay threshold, the SPS scheduling window based on the start moment of the SPS scheduling.

The time domain range $[t_0, t_0+T_{maxWaitingTime}]$, and an appropriate resource index is selected in the time domain range for time domain and frequency domain resource allocation.

The resource index supports a floating resource pool and a no-floating resource pool, and this specifically depends on a scheduling policy.

(c-1) Determining of a Resource Index

In consideration of inter-cell interference coordination, each cell selects a different subband start location in frequency domain based on a physical cell identifier (Cell ID), and selects an appropriate resource index within the range of $[t_0, t_0 \pm T_{maxWaitingTime}]$ according to the following rule, to determine a corresponding time domain location and a corresponding frequency domain location.

There are the following two cases depending on whether the base station obtains location information of the UE:

(A) the Base Station Cannot Obtain the Location Information of the UE.

When the base station cannot obtain the location information of the UE, the base station sequentially or randomly selects indexes of idle resources based on a sequence of resource indexes in a resource index set.

(B) The Base Station can Obtain the Location Information of the UE.

If an SA and data are transmitted twice, the base station sequentially selects, based on a location reported by the UE and an occupied frequency domain resource on a PC5 interface in $[t_0, t_0+T_{maxWaitingTime}]$, a closest subframe and a farthest subframe as corresponding resource indexes, and if there are a plurality of subframes having a same distance in frequency domain, selects a maximum subframe whose frequency domain resource is idle as an index of a resource allocated to the UE.

If an SA and data are transmitted once, the base station performs scheduling, in $[t_0, t_0+T_{maxWaitingTime}]$ in a mode in which even scheduling is performed in each TTI, that is, scheduling is performed first in frequency domain and then in time domain, based on a queue of UEs whose locations have been sorted and numbered, and if no appropriate resource can be found in frequency domain in the TTI, a next TTI is allocated for scheduling. An average quantity of scheduled UEs in each TTI is: a quotient obtained by dividing a quantity of to-be-scheduled UEs by $T_{maxWaitingTime}$, and the quotient is rounded up.

For same UE, when different SPS processes are enabled or dynamic scheduling is performed, a plurality of resource indexes in the different SPS processes need to be maintained at a current scheduling moment, and are staggered in time domain by using an offset.

(c-2) Location Resource Allocation

RB location allocation is performed, based on the resource index determined in (c-1), in frequency domain corresponding to $[t_0, t_0+T_{maxWaitingTime}]$.

(c-3) Delivery of a Plurality of Pieces of DCI, to Indicate Resource Allocation of a Plurality of SPS Processes In a specific time domain range, for same UE, a plurality of pieces of DCI may be delivered in a same TTI, to separately indicate start time domain locations of different resource allocation (dynamic scheduling and SPS) in a plurality of SPS processes. As shown in FIG. 6, m represents an offset.

(d) The SPS Resource is Reserved at the Fixed Time Domain and Frequency Domain Location Based on the SPS Scheduling Window and the Period.

In conclusion, the SPS resource is included in the SPS scheduling window, and the SPS scheduling window is used to indicate time-frequency domain resources that are used by the UE to respectively send control information and data information on a PSCCH and a PSSCH in one SPS period. In one embodiment, there may be at least one SPS scheduling window. The at least one SPS scheduling window is corresponding to one SPS period; the at least one SPS scheduling window is mutually staggered in time domain, or when the at least one SPS scheduling window overlaps in time domain, the at least one SPS scheduling window is mutually staggered in frequency domain; and time-frequency domain resources corresponding to a plurality of SPS processes of the UE are allocated in the plurality of SPS scheduling windows.

S205. The UE receives the SPS resource sent by the base station.

S206. If the UE determines that the SPS resource is insufficient to carry a to-be-sent TB size, the UE performs resource allocation based on the to-be-sent TB size in the following preset manners.

The preset manners may be an adaptive modulation and coding (AMC) manner, a manner of extending a quantity of resource blocks (RB), a resource overlapping manner, and a fragmentation manner. The resource overlapping manner is used to indicate that resources used for transmitting data of different UEs partially or completely overlap, and for details, refer to FIG. 7A and FIG. 7B.

Figure 7A:
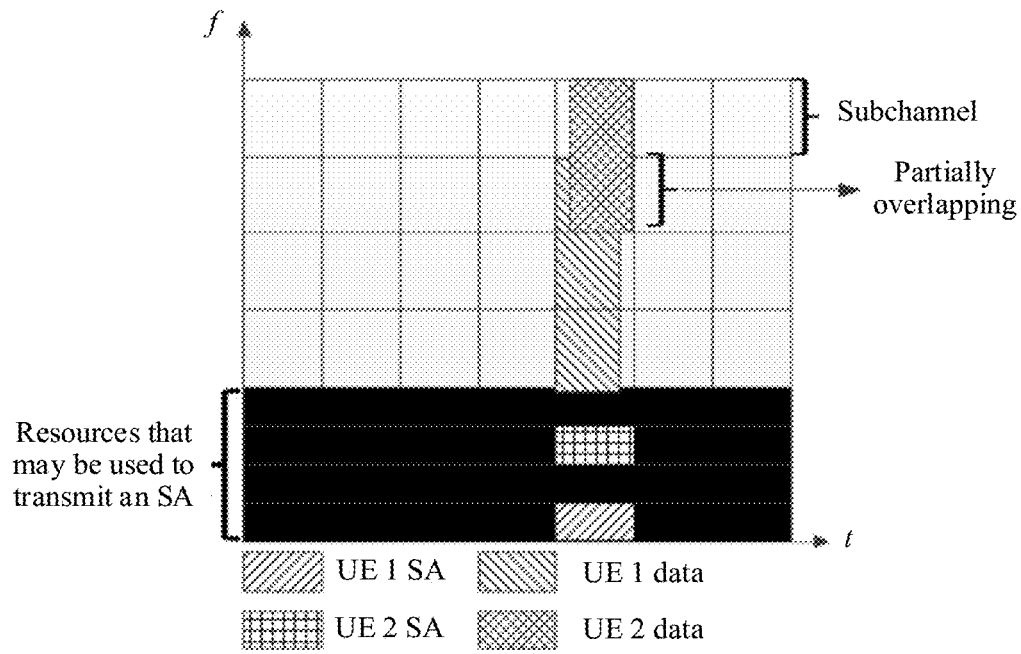
FIG. 7A and FIG. 7B are a diagram of an example of a resource overlapping manner in a data transmission method according to this application.
Figure 7B:
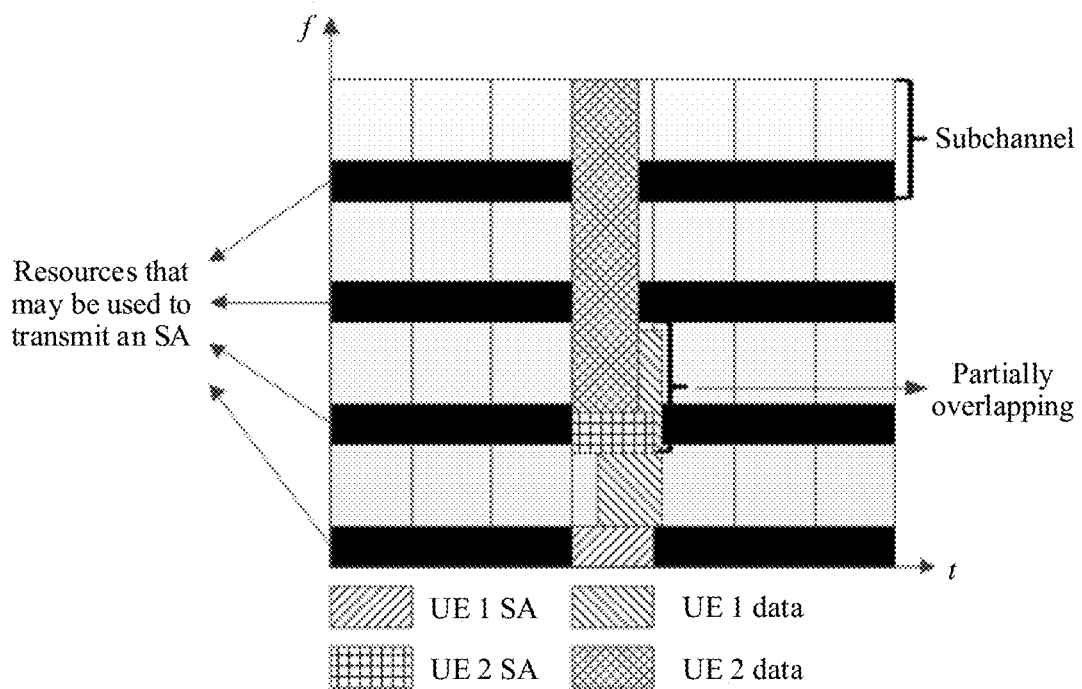

As shown in FIG. 7A and FIG. 7B, a horizontal coordinate represents a time domain, and a vertical coordinate represents a frequency domain. When UE 1 and UE 2 perform resource allocation in a same subframe, resources used by an SA of the UE 1 and an SA of the UE 2 are orthogonal, and resources used by data in the UE 1 and data in the UE 2 partially overlap. For a subchannel, in FIG. 7A, time-frequency domain resources used for respectively sending SA and data information on a PSCCH and a PSSCH are not adjacent, and in FIG. 7B, time-frequency domain resources used for respectively sending SA and data information on a PSCCH and a PSSCH are adjacent.

When the fragmentation manner is used, the UE performs, through dynamic scheduling or terminal autonomous resource selection, resource allocation for a part that cannot be carried by an SPS resource.

This operation is an optional operation.

In one embodiment, a V2X service supports a maximum of eight SPS processes, and periods of the V2X processes may be different. If the SPS processes collide in time domain and frequency domain, the UE needs to resolve collision of resource allocation for the plurality of SPS processes.

(a) When Only One SPS Process Exists or Dynamic Scheduling Data Needs to be Sent on the SPS Resource:

If an SA and data are in a same subframe but are not adjacent in frequency domain, if a delay requirement is high, that is, a delay is less than a threshold DelayTxTimeMinThr, which ranges from 30 ms to 40 ms by default, and may be configured, partial superposition of resources is performed in time domain and/or frequency domain.

For partial superposition of frequency domain resources, first, appropriate adjustment may be performed through AMC to carry a plurality of TB sizes. When the AMC adjustment reaches a maximum value, allocation is performed by expanding RB resources, and the RB resources and resources allocated to another user may be superposed in frequency domain.

If an SA and data are in a same subframe and adjacent in frequency domain, or have a low delay requirement (less than the threshold DelayTxTimeMaxThr, which is 100 ms by default and configurable), in this case, resource allocation is performed, through dynamic scheduling or terminal autonomous resource selection in a fragmentation manner, for a remaining part that is of the TB sizes and that cannot be carried.

(b) When Data of a Plurality of SPS Processes Needs to be Sent on the SPS Resource:

If the plurality of SPS processes collide in an SPS scheduling window, resource coordination is left to layer 2 (L2) of the UE for processing.

When resource allocation is performed for different SPS processes of same UE, SPS processes in different periods are staggered by using an offset in time domain. A specific coordination policy is as follows:

(1) If SPS resources are pre-allocated, the SPS resources for the plurality of SPS processes are combined and sent.

In this case, within an AMC running range, a frequency band allocated to a current SPS process supports scheduling of some or all of the TB sizes in the plurality of SPS processes, that is, combination is performed if resources can be combined, and dynamic scheduling is performed if resources cannot be combined.

(2) If any one of the SPS resources is insufficient to carry combined SPS resources of the plurality of SPS processes, the UE preferably ensures sending of a high-priority SPS process in the UE, and discards or postpones sending of a low-priority SPS process.

For a postponed low-priority SPS process, resource allocation may be performed through dynamic scheduling, or resource allocation may be performed through terminal autonomous selection, that is, the UE performs adaptive selection.

(3) A start RB location in time domain and frequency domain is determined by using DCI, and allocation is performed based on a quantity of actually allocated RBs with reference to AMC. The quantity of the allocated RBs may exceed a quantity of RBs granted by the base station, and frequency resources of the actually allocated RBs partially overlap with frequency domain resources allocated to another user.

(4) A plurality of SPS scheduling windows are reserved.

S207. The UE determines a waiting delay threshold based on a priority corresponding to the SPS assistance information.

S208. The UE determines that a first difference is less than or equal to the waiting delay threshold, where the first difference is the difference between the moment at which the data packet arrives at the logical channel and the start moment of the SPS scheduling.

The waiting delay threshold is VueSpsWaitTime, which is 20 ms by default and configurable.

a. If the Arrival Moment of the Data Packet is Before the Start Moment of the SPS Scheduling When the logical channel of the UE has data and a corresponding SPS process is enabled, if the first difference is less than or equal to the waiting delay threshold, the logical channel does not apply for an SR requesting dynamic scheduling or terminal autonomous resource selection from the base station for resource allocation, but the logical channel waits for an SPS process scheduling window corresponding to the logical channel (group), for resource allocation.

b. If the Arrival Moment of the Data Packet is after the Start Moment of the SPS Scheduling If the data packet misses a reserved SPS scheduling window, and an interval between a moment of the data packet and a moment of a next SPS scheduling window is greater than the waiting delay threshold, a dynamic scheduling procedure or a terminal autonomous resource selection procedure is used for supplementation.

Alternatively, if the UE determines that the first difference is greater than the waiting delay threshold, the UE performs data transmission by using a resource selected through dynamic scheduling. Alternatively, if the UE determines that the first difference is greater than the waiting delay threshold, performing, by the UE, data transmission by using a resource selected through terminal autonomous resource selection.

S207 and S208 are optional operations.

S209. The UE performs data transmission by using the SPS resource.

For a plurality of SPS scheduling windows, different from the foregoing embodiment, a relatively close SPS scheduling window is first allocated provided that data exists in a buffer of a logical channel corresponding to an SPS process. A mutual location relationship between the SPS scheduling windows may be dynamically configured by the base station.

Regardless of the base station scheduling grant or the terminal autonomous resource selection, the UE uses the plurality of SPS scheduling windows to prevent a delay increase caused by data packet fluctuation, and reduce a V2X service transmission delay.

Based on the foregoing embodiment, the data transmission method may further include: receiving, by the UE, a system message or RRC signaling sent by the base station. The system message or the RRC signaling is used to configure a priority for the UE, and the priority is used by the UE to determine a scheduling mode. The scheduling mode may include a base station scheduling grant and terminal autonomous resource selection. When a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

When the UE is in an RRC connected state, the UE may perform the base station scheduling grant (Mode 3) and the terminal autonomous resource selection (Mode 4).

In addition, before the receiving, by the UE, the SPS resource sent by the base station, the method may further include: receiving, by the UE, reconfiguration information sent by the base station, where the reconfiguration information includes a period configured by the base station for the UE and an SPS process index.

Further, before the allocating, by the base station, the SPS resource to the UE, the method may further include: configuring, by the base station based on SPS assistance information sent by a plurality of UEs, user-level SPS or cell-level SPS for any one of the plurality of UEs by using RRC signaling.

For PC5 interface-based D2D communication, a severe near-far effect or in-band emission exists between locations of the plurality of UEs. Therefore, a location relationship between the UEs is introduced in SPS. The near-far effect causes in-band emission interference. For example, two UEs, such as V_UE 1 and V_UE 2, send different frequency band resources at a same moment. Because there is in-band emission interference, V_UE 3 receives only a safety message of the V_UE 1 closer to the V_UE 3, and loses a safety message sent by the V_UE 2 farther to the V_UE 3.

The base station configures, depending on whether location information of the UEs exists, user-level SPS and cell-level SPS for the UEs by using RRC signaling. The user-level SPS means that each user performs SPS activation according to a specific policy. The cell-level SPS means that it is comprehensively considered that central SPS activation and SPS deactivation are to be performed on users for which SPS is to be enabled within a range of a cell.

If reporting location information by the UE is enabled, the base station obtains a user location, and the cell-level SPS is used. If reporting location information by the UE is disabled, the user-level SPS is used.

Simulation performance display: Packet delivery rate (PDR) performance of the cell-level SPS is better than PDR performance of the user-level SPS.

In one embodiment, all or some of the operations of the foregoing method embodiments may be implemented by a program instructing relevant hardware. The foregoing program may be stored in a computer-readable storage medium. When the program is executed, the operations of the foregoing method embodiments are performed. The foregoing storage medium includes various media that can store program code, such as a ROM, a RAM, a magnetic disk, or an optical disc.

Figure 8:
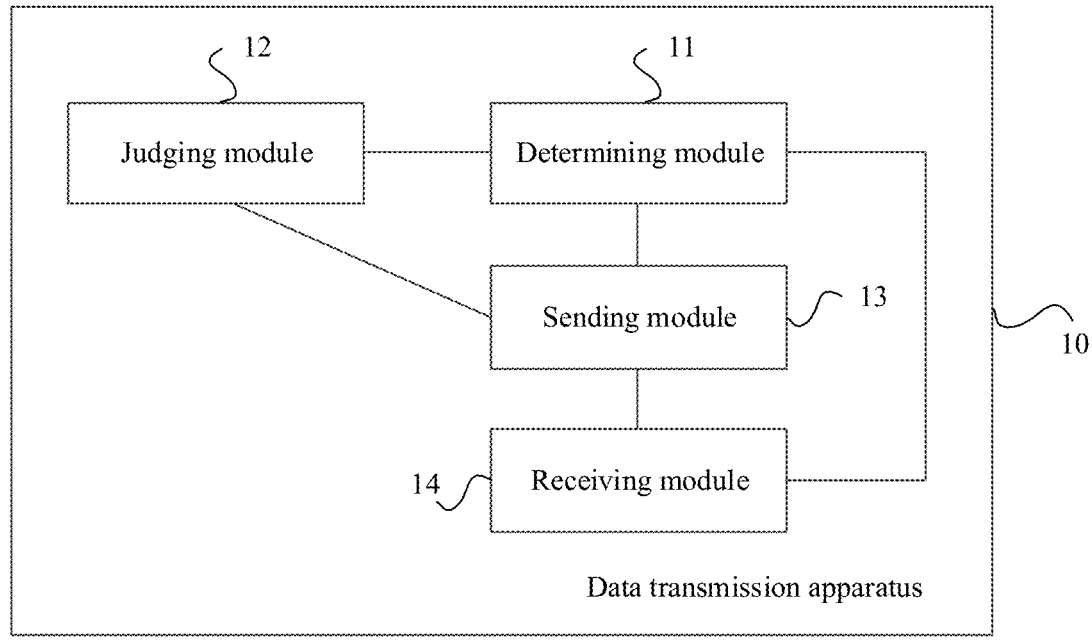
FIG. 8 is a schematic structural diagram of a data transmission apparatus according to an embodiment of this application.

FIG. 8 is a schematic structural diagram of a data transmission apparatus according to an embodiment of this application. The data transmission apparatus may be integrated into UE. Alternatively, the data transmission apparatus may further be UE. The data transmission apparatus may be implemented by using software, hardware, or a combination of software and hardware. As shown in FIG. 8, the data transmission apparatus 10 includes: a determining module 11, a judging module 12, a sending module 13, and a receiving module 14.

In one embodiment, the determining module 11 is configured to determine SPS assistance information based on N data packets at layer 2. The SPS assistance information includes a frame number and a subframe number that are corresponding to a moment offset. N is an integer greater than or equal to 1. Service features corresponding to the N data packets are the same, and the service feature includes at least a period configured by a base station for the UE.

The judging module 12 is configured to determine whether a preset condition is satisfied.

The sending module 13 is configured to: if a result output by the judging module 12 is that a preset condition is satisfied, send the SPS assistance information determined by the determining module 11 to the base station.

The receiving module 14 is configured to receive an SPS resource sent by the base station.

In addition, the sending module 13 is further configured to perform data transmission by using the SPS resource.

The data transmission apparatus provided in this embodiment of this application may execute the foregoing UE-side method embodiment. Their implementation principles and technical effects are similar, and details are not described herein again.

In one embodiment, the determining module 11 may be specifically configured to: obtain the moment offset based on offset moments at which the N data packets at layer 2 arrive at a logical channel. The moment offset may be an average of the offset moments, a minimum arrival offset moment, a maximum arrival offset moment, a latest arrival moment, or any one of N arrival moments at which the N data packets arrive at the logical channel, and the logical channel is used to provide a transmission service for data.

For example, when the moment offset is the average of the offset moments at which the N data packets arrive at the logical channel, the determining module 11 may be specifically configured to: obtain N−1 mapping offset moments by adding period differences between arrival moments of N−1 data packets and an arrival moment of an $M^{th}$ data packet and the offset moments at which the N−1 data packets in the N data packets arrive at the logical channel or subtract period differences between arrival moments of N−1 data packets and an arrival moment of an $M^{th}$ data packet from the offset moments at which the N−1 data packets in the N data packets arrive at the logical channel, where the N data packets include the $M^{th}$ data packet and the N−1 data packets, and the $M^{th}$ data packet is any one of the N data packets; obtain an average of the N−1 mapping offset moments; and determine a sum of the arrival moment of the $M^{th}$ data packet and the average of the N−1 mapping offset moments as the moment offset.

The preset condition may be any one of the following conditions:
  condition 1: the sending module 13 sends the SPS assistance information to the base station for the first time;
  condition 2: when the sending module 13 sends the SPS assistance information to the base station not for the first time, the judging module 12 determines a difference between a start moment of SPS scheduling and an arrival moment of a data packet, and the difference is greater than or equal to a preset threshold for consecutive $M_1$ times, where $M_1$ is a positive integer, and N is greater than or equal to $M_1$;
  condition 3: the judging module 12 determines an arrival period of a data packet, arrival periods of consecutive $M_2$ data packets are different from the period configured by the base station for the UE, and the arrival periods of the $M_2$ data packets are the same, where $M_2$ is a positive integer, N is greater than or equal to $M_2$, and the arrival period is an actual period of the data packet; and condition 4: the judging module 12 determines a to-be-sent TB size of a service corresponding to the N data packets in a buffer, and index corresponding to the to-be-sent TB size changes for consecutive $M_3$ times, where $M_3$ is a positive integer, and N is greater than or equal to $M_3$.

Figure 9:
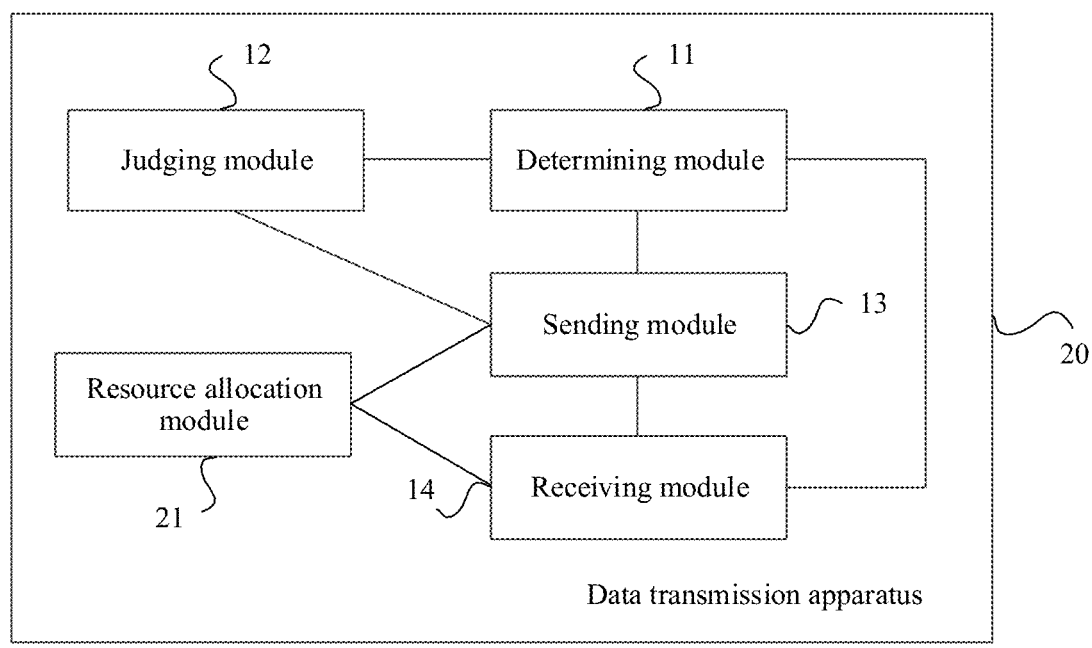
FIG. 9 is a schematic structural diagram of a data transmission apparatus according to another embodiment of this application.

FIG. 9 is a schematic structural diagram of a data transmission apparatus according to another embodiment of this application. As shown in FIG. 9, based on the structure shown in FIG. 8, the data transmission apparatus 20 may further include a resource allocation module 21.

The resource allocation module 21 may be configured to: before the sending module 13 performs data transmission by using the SPS resource, if determining that the SPS resource is insufficient to carry the to-be-sent TB size, perform resource allocation based on the to-be-sent TB size in any one of the following manners: an AMC manner, a manner of extending a quantity of RBs, a resource overlapping manner, and a fragmentation manner, where the resource overlapping manner is used to indicate that resources used for transmitting data of different UEs partially or completely overlap.

In one embodiment, the sending module 13 may be further configured to: before the receiving module 14 receives the SPS resource sent by a base station, send a BSR to the base station. The BSR may include a volume of corresponding to-be-transmitted data of a non-SPS activated process in the buffer, and the process has data on the logical channel.

Further, in some embodiments, the determining module 11 may further configured to: after the receiving module 14 receives the SPS resource sent by the base station, determine a waiting delay threshold based on a priority corresponding to the SPS assistance information; and determine that a first difference is less than or equal to the waiting delay threshold, where the first difference is the difference between the moment at which the data packet arrives at the logical channel and the start moment of the SPS scheduling.

In some embodiments, the determining module 11 may be further configured to determine that the first difference is greater than the waiting delay threshold. Correspondingly, the sending module 13 may be further configured to: if the determining module 11 determines that the first difference is greater than the waiting delay threshold, perform data transmission by using a resource selected through dynamic scheduling.

Alternatively, the sending module 13 may be further configured to: if the determining module 11 determines that the first difference is greater than the waiting delay threshold, perform data transmission by using a resource selected through terminal autonomous resource selection.

In the foregoing embodiment, the SPS resource is included in an SPS scheduling window. The SPS scheduling window is used to indicate time-frequency domain resources that are used by the data transmission apparatus to respectively send control information and data information on a PSCCH and a PSSCH in one SPS period.

In one embodiment, there may be at least one SPS scheduling window. The at least one SPS scheduling window is corresponding to one SPS period; the at least one SPS scheduling window is mutually staggered in time domain, or when the at least one SPS scheduling window overlaps in time domain, the at least one SPS scheduling window is mutually staggered in frequency domain; and time-frequency domain resources corresponding to a plurality of SPS processes of the data transmission apparatus are allocated in the plurality of SPS scheduling windows.

Further, the receiving module 14 may be further configured to receive a system message or RRC signaling sent by the base station. The system message or the RRC signaling is used to configure a priority for the UE, and the priority is used by the determining module 11 to determine a scheduling mode. The scheduling mode may include a base station scheduling grant and terminal autonomous resource selection. When a priority of a data packet of the UE is higher than the priority configured by the base station for the UE, the determining module 11 may determine that the scheduling mode is the base station scheduling grant; or when a priority of a data packet of the UE is equal to or lower than the priority configured by the base station for the UE, the determining module 11 may determine that the scheduling mode is the terminal autonomous resource selection.

The data transmission apparatus provided in this embodiment of this application may execute the foregoing UE-side method embodiment. Their implementation principles and technical effects are similar, and details are not described herein again.

Figure 10:
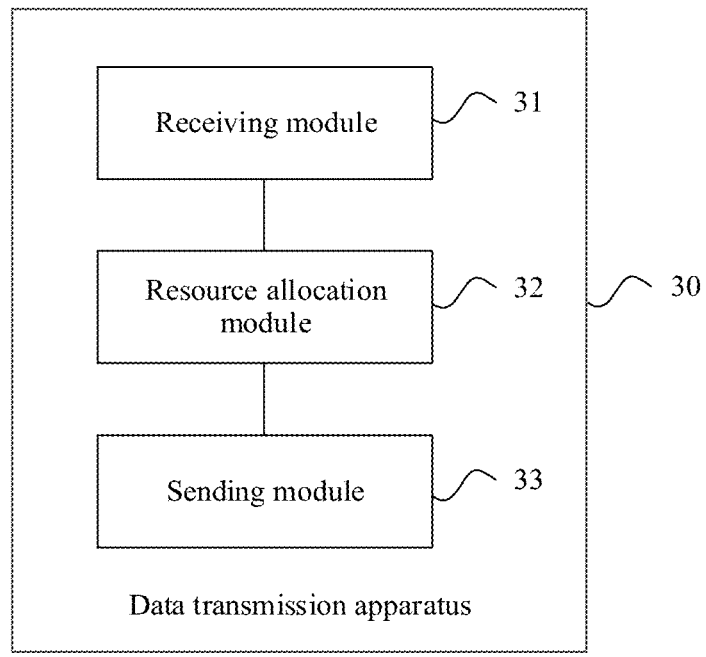
FIG. 10 is a schematic structural diagram of a data transmission apparatus according to still another embodiment of this application.

FIG. 10 is a schematic structural diagram of a data transmission apparatus according to still another embodiment of this application. The data transmission apparatus may be integrated into a base station. Alternatively, the data transmission apparatus may be a base station. The data transmission apparatus may be implemented by using software, hardware, or a combination of software and hardware. As shown in FIG. 10, the data transmission apparatus 30 includes: a receiving module 31, a resource allocation module 32, and a sending module 33.

In one embodiment, the receiving module 31 is configured to receive SPS assistance information sent by UE. The SPS assistance information is determined by the UE based on N data packets at layer 2. The SPS assistance information includes a frame number and a subframe number that are corresponding to a moment offset. Service features corresponding to the N data packets are the same, and the service feature includes at least a period configured by the base station for the UE.

The resource allocation module 32 is configured to allocate an SPS resource to the UE based on the SPS assistance information received by the receiving module 31.

The sending module 33 is configured to send the SPS resource to the UE.

The data transmission apparatus provided in this embodiment of this application may execute the foregoing base station-side method embodiment. Their implementation principles and technical effects are similar, and details are not described herein again.

In an embodiment, the SPS assistance information may further include a priority and a period. In this embodiment, the resource allocation module 32 may be specifically configured to: determine a start moment of SPS scheduling based on the frame number and the subframe number that are corresponding to the moment offset and a preset delay offset; determine a waiting delay threshold based on the priority corresponding to the SPS assistance information; determine, in a time domain range corresponding to the waiting delay threshold, an SPS scheduling window based on the start moment of the SPS scheduling, where the SPS scheduling window is used to indicate time-frequency domain resources that are used by the UE to respectively send control information and data information on a PSCCH and a PSSCH in one SPS period; and reserve the SPS resource at a fixed time domain and frequency domain location based on the SPS scheduling window and the period that is in the SPS assistance information.

In one embodiment, there may be at least one SPS scheduling window. The at least one SPS scheduling window is corresponding to one SPS period; the at least one SPS scheduling window is mutually staggered in time domain, or when the at least one SPS scheduling window overlaps in time domain, the at least one SPS scheduling window is mutually staggered in frequency domain; and time-frequency domain resources corresponding to a plurality of SPS processes of the UE are allocated in the plurality of SPS scheduling windows.

Further, the sending module 33 may be further configured to send a system message or RRC signaling to the UE. The system message or the RRC signaling is used to configure a priority for the UE, and the priority is used by the UE to determine a scheduling mode, that is, the UE determines the scheduling mode based on the priority.

In one embodiment, the scheduling mode may include a base station scheduling grant and terminal autonomous resource selection. When a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

In one embodiment, the receiving module 31 may be further configured to: before the resource allocation module 32 allocates the SPS resource to the UE based on the SPS assistance information, receive a BSR sent by the UE. The BSR includes a volume of corresponding to-be-transmitted data of a non-SPS activated process in a buffer, and the process has data on the logical channel.

It should be noted that, it should be understood that the sending module may be a transmitter during actual implementation, the receiving module may be a receiver during actual implementation, and the resource allocation module, the judging module, the determining module, and the like may be processors or microprocessors on which corresponding programs having a processing function are loaded. In an implementation process, operations in the foregoing methods or the foregoing modules may be implemented by using a hardware integrated logical circuit in the processor elements, or by using instructions in a form of software.

For example, the foregoing modules may be configured as one or more integrated circuits implementing the foregoing method, for example, one or more application-specific integrated circuits (ASIC), one or more microprocessors (digital signal processor, DSP), or one or more field programmable gate arrays (FPGA). For another example, when a module is implemented by a processing element scheduling program code, the processing element may be a general-purpose processor, for example, a central processing unit (CPU) or another processor that can invoke the program code. For another example, these modules may be integrated together, and implemented in a form of a system-on-a-chip (SOC).

Figure 11:
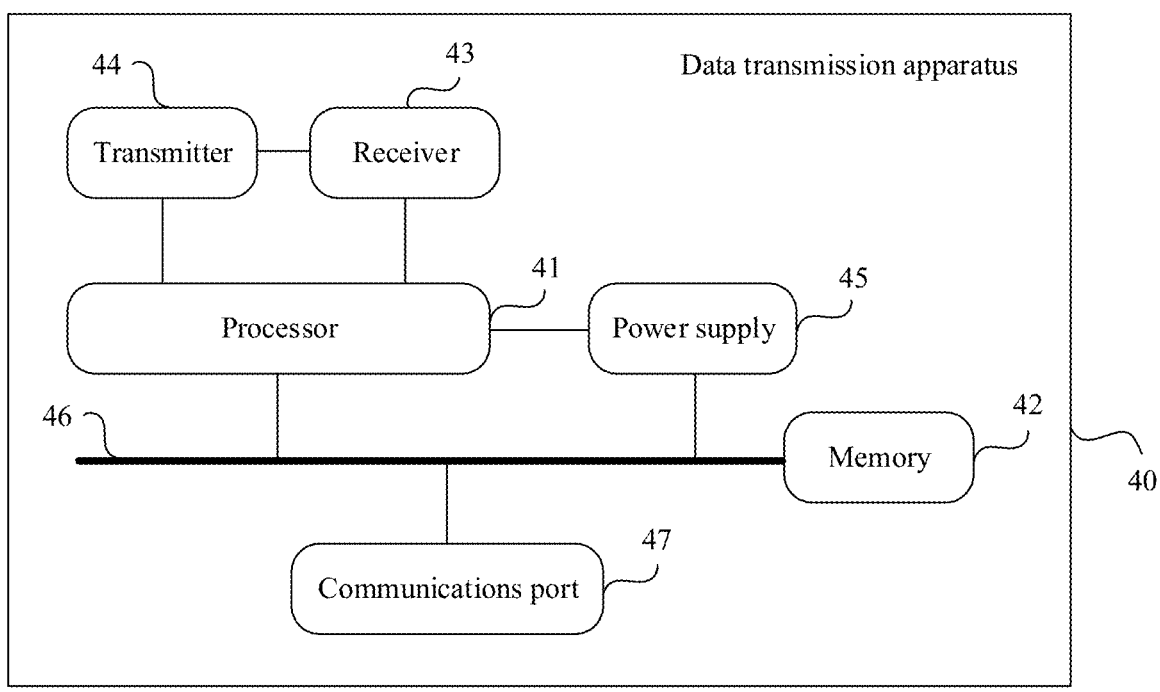
FIG. 11 is a schematic structural diagram of a data transmission apparatus according to still another embodiment of this application.

FIG. 11 is a schematic structural diagram of a data transmission apparatus according to still another embodiment of this application. As shown in FIG. 11, the data transmission apparatus 40 provided in this embodiment includes: a processor 41 (for example, a CPU), a memory 42, a receiver 43, and a transmitter 44. The receiver 43 and the transmitter 44 are coupled to the processor 41. The processor 41 controls a receiving action of the receiver 43, and the processor 41 controls a sending action of the transmitter 44. The memory 42 may include a high-speed RAM memory, or may further include a non-volatile memory NVM, for example, at least one magnetic disk storage. The memory 42 may store various instructions, to implement various processing functions and implement method operations of this embodiment of this application.

In one embodiment, the data transmission apparatus in this embodiment of this application may further include: a power supply 45, a communications bus 46, and a communications port 47. The receiver 43 and the transmitter 44 may be integrated into a transceiver of the data transmission apparatus, or may be independent transceiver antennas on the data transmission apparatus. The communications bus 46 is configured to implement communication connection between elements. The communications port 47 is configured to implement communication connection between the data transmission apparatus and another peripheral.

In this embodiment of this application, the memory 42 is configured to store computer executable program code, and the program code includes an instruction. When the processor 41 executes the instruction, the instruction enables the processor 41 to perform a determining action, a judging action, and a resource allocation action of the UE in the foregoing method embodiment, so that the transmitter 44 performs a sending action of the UE in the foregoing method embodiment, and the receiver 43 performs a receiving action of the UE in the foregoing method embodiment. Their implementation principles and technical effects are similar, and details are not described herein again.

Figure 12:
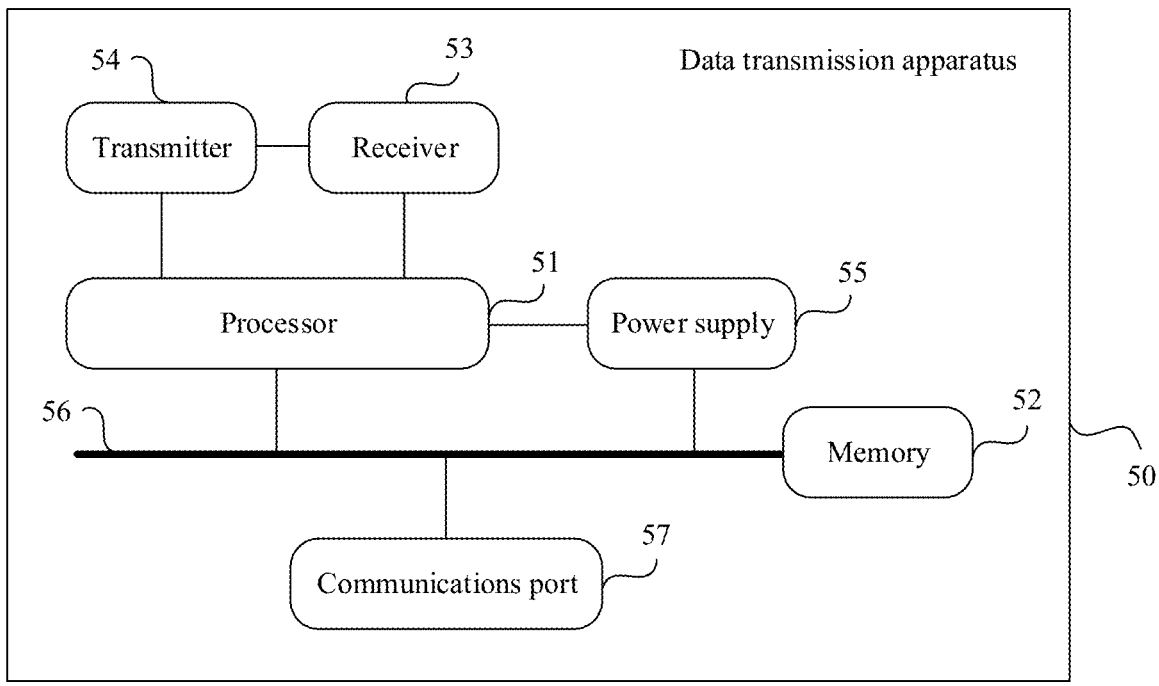
FIG. 12 is a schematic structural diagram of a data transmission apparatus according to still another embodiment of this application.

FIG. 12 is a schematic structural diagram of a data transmission apparatus according to still another embodiment of this application. As shown in FIG. 12, the data transmission apparatus 50 provided in this embodiment includes: a processor 51 (for example, a CPU), a memory 52, a receiver 53, and a transmitter 54. The receiver 53 and the transmitter 54 are coupled to the processor 51. The processor 51 controls a receiving action of the receiver 53, and the processor 51 controls a sending action of the transmitter 54. The memory 52 may include a high-speed RAM memory, or may further include a non-volatile memory NVM, for example, at least one magnetic disk storage. The memory 52 may store various instructions, to implement various processing functions and implement method operations of this embodiment of this application.

In one embodiment, the data transmission apparatus in this embodiment of this application may further include: a power supply 55, a communications bus 56, and a communications port 57. The receiver 53 and the transmitter 54 may be integrated into a transceiver of the data transmission apparatus, or may be independent transceiver antennas on the data transmission apparatus. The communications bus 56 is configured to implement communication connection between elements. The communications port 57 is configured to implement communication connection between the data transmission apparatus and another peripheral.

In this embodiment of this application, the memory 52 is configured to store computer executable program code, and the program code includes an instruction. When the processor 51 executes the instruction, the instruction enables the processor 51 to perform a resource allocation action of the base station in the foregoing method embodiment, so that the transmitter 54 performs a sending action of the base station in the foregoing method embodiment, and the receiver 53 performs a receiving action of the base station in the foregoing method embodiment. Their implementation principles and technical effects are similar, and details are not described herein again.

What is claimed is:

1. A method of data transmission, comprising:
   determining, by user equipment (UE), semi-persistent scheduling (SPS) assistance information based on N data packets at layer 2, wherein the SPS assistance information comprises a frame number and a subframe number that correspond to a moment offset, wherein N is an integer greater than or equal to 1, and wherein the N data packets correspond to same service features, and wherein each of the service features comprises at least a period configured by a base station for the UE;
   in response to a preset condition being satisfied, sending, by the UE, the SPS assistance information to the base station;
   receiving, by the UE, an SPS resource from the base station; and
   performing, by the UE, data transmission by using the SPS resource.

2. The method according to claim 1, wherein the determining, by UE, of the SPS assistance information based on the N data packets at layer 2 comprises:
   obtaining, by the UE, the moment offset based on offset moments at which the N data packets at layer 2 arrive at a logical channel, wherein the moment offset is an average of the offset moments, a minimum arrival offset moment, a maximum arrival offset moment, or a latest arrival moment, wherein the logical channel is used to provide a transmission service for data.

3. The method according to claim 2, wherein when the moment offset is the average of the offset moments, the obtaining of the moment offset comprises:
   obtaining, by the UE, N−1 mapping offset moments by adding period differences between arrival moments of N−1 data packets and an arrival moment of an $M^{th}$ data packet to the offset moments, or by subtracting the period differences from the offset moments, wherein the N data packets comprise the $M^{th}$ data packet and the N−1 data packets, and the $M^{th}$ data packet is any one of the N data packets;
   obtaining, by the UE, an average of the N−1 mapping offset moments; and
   determining, by the UE, a sum of the arrival moment of the $M^{th}$ data packet and the average of the N−1 mapping offset moments as the moment offset.

4. The method according to claim 1, wherein the preset condition is any one of the following conditions:
   condition 1: the UE sends the SPS assistance information to the base station for a first time;
   condition 2: when the UE sends the SPS assistance information to the base station not for a first time, the UE determines a difference between a start moment of SPS scheduling and an arrival moment of a data packet, and the difference is greater than or equal to a preset threshold for consecutive $M_1$ times, wherein $M_1$ is a positive integer, and N is greater than or equal to $M_1$;
   condition 3: the UE determines an arrival period of a data packet, arrival periods of consecutive $M_2$ data packets are different from the period configured by the base station for the UE, and the arrival periods of the $M_2$ data packets are the same, wherein $M_2$ is a positive integer, N is greater than or equal to $M_2$, and the arrival period is an actual period of the data packet; and
   condition 4: the UE determines a to-be-sent transport block (TB) size that is of a service corresponding to the N data packets in a buffer, and index corresponding to the to-be-sent TB size changes for consecutive $M_3$ times, wherein $M_3$ is a positive integer, and N is greater than or equal to $M_3$.

5. The method according to claim 1, wherein before the performing, by the UE, of the data transmission by using the SPS resource, the method further comprises:
   in response to the UE determining that the SPS resource is insufficient to carry the to-be-sent transport block size, performing, by the UE, resource allocation based on the to-be-sent transport block size in any one of the following manners:
   an adaptive modulation and coding (AMC) manner, a manner of extending a quantity of resource blocks (RB), a resource overlapping manner, and a fragmentation manner, wherein the resource overlapping manner is used to indicate that resources used for transmitting data of different UEs partially or completely overlap.

6. The method according to claim 1, wherein before the receiving, by the UE, the SPS resource sent by the base station, the method further comprises:
   sending, by the UE, a buffer status report (BSR) to the base station, wherein the BSR comprises a volume of corresponding to-be-transmitted data of a non-SPS activated process in a buffer, and the non-SPS activated process has data on a logical channel.

7. The method according to claim 1, wherein after the receiving, by the UE, of the SPS resource from the base station, the method further comprises:
   determining, by the UE, a waiting delay threshold based on a priority corresponding to the SPS assistance information; and
   determining, by the UE, that a first difference is less than or equal to the waiting delay threshold, wherein the first difference is between a moment at which a data packet arrives at a logical channel and a start moment of the SPS scheduling.

8. The method according to claim 7, wherein the method further comprises:
   in response to the UE determining that the first difference is greater than the waiting delay threshold, performing, by the UE, the data transmission by using a resource selected through dynamic scheduling; or
   in response to the UE determining that the first difference is greater than the waiting delay threshold, performing, by the UE, the data transmission by using a resource selected through terminal autonomous resource selection.

9. The method according to claim 1, wherein the SPS resource is comprised in an SPS scheduling window, which is used to indicate time-frequency domain resources used by the UE to respectively send control information and data information on a physical sidelink control channel (PSCCH) and a physical sidelink shared channel (PSSCH) in one SPS period.

10. The method according to claim 9,
    wherein the SPS scheduling window is one of at least one SPS scheduling window that corresponds to one SPS period;
    wherein the at least one SPS scheduling window is mutually staggered in time domain, or mutually staggered in frequency domain when the at least one SPS scheduling window overlaps in time domain; and
    wherein time-frequency domain resources corresponding to a plurality of SPS processes of the UE are allocated in the plurality of SPS scheduling windows.

11. The method according to claim 1, wherein the method further comprises:
receiving, by the UE, a system message or radio resource control (RRC) signaling from the base station, wherein the system message or the RRC signaling is used to configure a priority for the UE, and the priority is used by the UE to determine a scheduling mode, wherein
the scheduling mode comprises a base station scheduling grant and terminal autonomous resource selection; and
when a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

12. A apparatus for data transmission, comprising:
a processor, configured to determine semi-persistent scheduling (SPS) assistance information based on N data packets at layer 2, wherein the SPS assistance information comprises a frame number and a subframe number that correspond to a moment offset, wherein N is an integer greater than or equal to 1, wherein the N data packets correspond to same service features, and wherein each of the service features comprises at least a period configured by a base station for the UE;
the processor is further configured to determine whether a preset condition is satisfied;
a transmitter, configured to: in response to the processor determining that a preset condition is satisfied, send the SPS assistance information determined by the processor to the base station; and
a receiver, configured to receive an SPS resource from the base station, wherein
the transmitter is further configured to perform data transmission by using the SPS resource.

13. The apparatus according to claim 12, wherein the processor is configured to:
obtain the moment offset based on offset moments at which the N data packets at layer 2 arrive at a logical channel, wherein the moment offset is an average of the offset moments, a minimum arrival offset moment, a maximum arrival offset moment, a latest arrival moment, wherein the logical channel is used to provide a transmission service for data.

14. The apparatus according to claim 13, wherein when the moment offset is the average of the offset moments, the processor is configured to:
obtain N−1 mapping offset moments by adding period differences between arrival moments of N−1 data packets and an arrival moment of an $M^{th}$ data packet to the offset, or by subtracting the period differences between the arrival moments of N−1 data packets and the arrival moment of an $M^{th}$ data packet from the offset moments, wherein the N data packets comprise the $M^{th}$ data packet and the N−1 data packets, and the $M^{th}$ data packet is any one of the N data packets;
obtain an average of the N−1 mapping offset moments; and
determine a sum of the arrival moment of the $M^{th}$ data packet and the average of the N−1 mapping offset moments as the moment offset.

15. The apparatus according to claim 12, wherein the preset condition is any one of the following conditions:
condition 1: the transmitter sends the SPS assistance information to the base station for a first time;
condition 2: when the transmitter sends the SPS assistance information to the base station not for a first time, the processor determines a difference between a start moment of SPS scheduling and an arrival moment of a data packet, and the difference is greater than or equal to a preset threshold for consecutive $M_1$ times, wherein $M_1$ is a positive integer, and N is greater than or equal to $M_1$;
condition 3: the processor determines an arrival period of a data packet, arrival periods of consecutive $M_2$ data packets are different from the period configured by the base station for the UE, and the arrival periods of the $M_2$ data packets are the same, wherein $M_2$ is a positive integer, N is greater than or equal to $M_2$, and the arrival period is an actual period of the data packet; and
condition 4: the processor determines a to-be-sent transport block size TB size of a service corresponding to the N data packets in a buffer, and index corresponding to the to-be-sent TB size changes for consecutive $M_3$ times, wherein $M_3$ is a positive integer, and N is greater than or equal to $M_3$.

16. A apparatus for data transmission, comprising:
a receiver, configured to receive semi-persistent scheduling (SPS) assistance information from user equipment (UE), wherein the SPS assistance information is determined by the UE based on N data packets at layer 2, the SPS assistance information comprises a frame number and a subframe number that correspond to a moment offset, wherein the N data packets correspond to same service features, and wherein each of the service features comprises at least a period configured by a base station for the UE;
a processor, configured to allocate an SPS resource to the UE based on the SPS assistance information received by the receiver; and
a transmitter, configured to send the SPS resource to the UE.

17. The apparatus according to claim 16, wherein the SPS assistance information further comprises a priority and a period, and the processor is configured to:
determine a start moment of SPS scheduling based on the frame number and the subframe number that correspond to the moment offset and a preset delay offset;
determine a waiting delay threshold based on the priority;
determine, in a time domain range corresponding to the waiting delay threshold, an SPS scheduling window based on the start moment of the SPS scheduling, wherein the SPS scheduling window is used to indicate time-frequency domain resources that are used by the UE to respectively send control information and data information on a physical sidelink control channel (PSCCH) and a physical sidelink shared channel (PSSCH) in one SPS period; and
reserve the SPS resource at a fixed time domain and frequency domain location based on the SPS scheduling window and the period.

18. The apparatus according to claim 17, wherein the SPS scheduling window is one of at least one SPS scheduling window, and the at least one SPS scheduling window that corresponds to one SPS period;
wherein the at least one SPS scheduling window is mutually staggered in time domain, or mutually staggered in frequency domain when the at least one SPS scheduling window overlaps in time domain; and
wherein time-frequency domain resources corresponding to a plurality of SPS processes of the UE are allocated in the plurality of SPS scheduling windows.

19. The apparatus according to claim 16, wherein the transmitter is further configured to:
- send a system message or radio resource control (RRC) signaling to the UE, wherein the system message or the RRC signaling is used to configure a priority for the UE, and the priority is used by the UE to determine a scheduling mode, wherein
- the scheduling mode comprises a base station scheduling grant and terminal autonomous resource selection; and when a priority of a data packet of the UE is higher than the priority configured by the base station for the UE, the UE determines that the scheduling mode is the base station scheduling grant; or when a priority of a data packet of the UE is equal to or lower than the priority configured by the base station for the UE, the UE determines that the scheduling mode is the terminal autonomous resource selection.

20. The apparatus according to claim 16, wherein the receiver is further configured to:
- before the processor allocates the SPS resource to the UE based on the SPS assistance information, receive a buffer status report BSR sent by the UE, wherein the BSR comprises a volume of corresponding to-be-transmitted data of a non-SPS activated process in a buffer, and the non-SPS activated process has data on a logical channel.

* * * * *